United States Patent
Gormley

(10) Patent No.: US 11,391,241 B2
(45) Date of Patent: *Jul. 19, 2022

(54) DRIVE SYSTEM FOR TRANSLATING STRUCTURE

(71) Applicant: ROHR, INC., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 16/531,824

(22) Filed: Aug. 5, 2019

(65) Prior Publication Data

US 2021/0040914 A1  Feb. 11, 2021

(51) Int. Cl.
*F02K 1/76* (2006.01)
*F02K 1/09* (2006.01)

(52) U.S. Cl.
CPC ............. *F02K 1/763* (2013.01); *F02K 1/766* (2013.01); *F02K 1/09* (2013.01); *F05D 2210/12* (2013.01); *F05D 2220/323* (2013.01); *F05D 2270/64* (2013.01)

(58) Field of Classification Search
CPC . F02K 1/763; F02K 1/766; F02K 1/70; F02K 1/72; F02K 1/62; F02K 1/625; F02K 1/76; F05D 2270/64
See application file for complete search history.

(56) References Cited

U.S. PATENT DOCUMENTS

| | | | |
|---|---|---|---|
| 4,909,442 A * | 3/1990 | Fernz | F02K 1/72 239/265.29 |
| 9,303,590 B2 | 4/2016 | West et al. | |
| 9,322,360 B2 | 4/2016 | James | |
| 2015/0108249 A1* | 4/2015 | James | F02K 1/62 239/265.19 |
| 2015/0267641 A1* | 9/2015 | Gormley | F02K 1/766 239/265.19 |
| 2017/0198659 A1 | 7/2017 | Gormley | |

FOREIGN PATENT DOCUMENTS

| | | |
|---|---|---|
| EP | 1288479 | 3/2003 |
| WO | 29612881 | 5/1996 |
| WO | 03036063 | 5/2003 |

OTHER PUBLICATIONS

USPTO, Restriction/Election Requirement dated Jul. 13, 2021 in U.S. Appl. No. 16/532,070.
European Patent Office, European Patent Office dated Jul. 17, 2020 in Application No. 19216491.1.
USPTO Pre-Interview First Office Action Office Action dated Oct. 20, 2021 in U.S. Appl. No. 16/532,070.
USPTO Final Office Action dated Jan. 19, 2022 in U.S. Appl. No. 16/532,070.
USPTO, Notice of Allowance dated Mar. 30, 2022 in U.S. Appl. No. 16/532,070.

* cited by examiner

*Primary Examiner* — Andrew H Nguyen
(74) *Attorney, Agent, or Firm* — Snell & Wilmer L.L.P.

(57) ABSTRACT

A nacelle system having a translating structure is disclosed. In various embodiments, the nacelle system includes a fixed structure; a thrust reverser having a translating sleeve configured to translate relative to the fixed structure and in response to a first dual-circuit hydraulic system; and a variable area fan nozzle having a translating nozzle configured to translate relative to the translating sleeve and in response to a second dual-circuit hydraulic system.

5 Claims, 12 Drawing Sheets

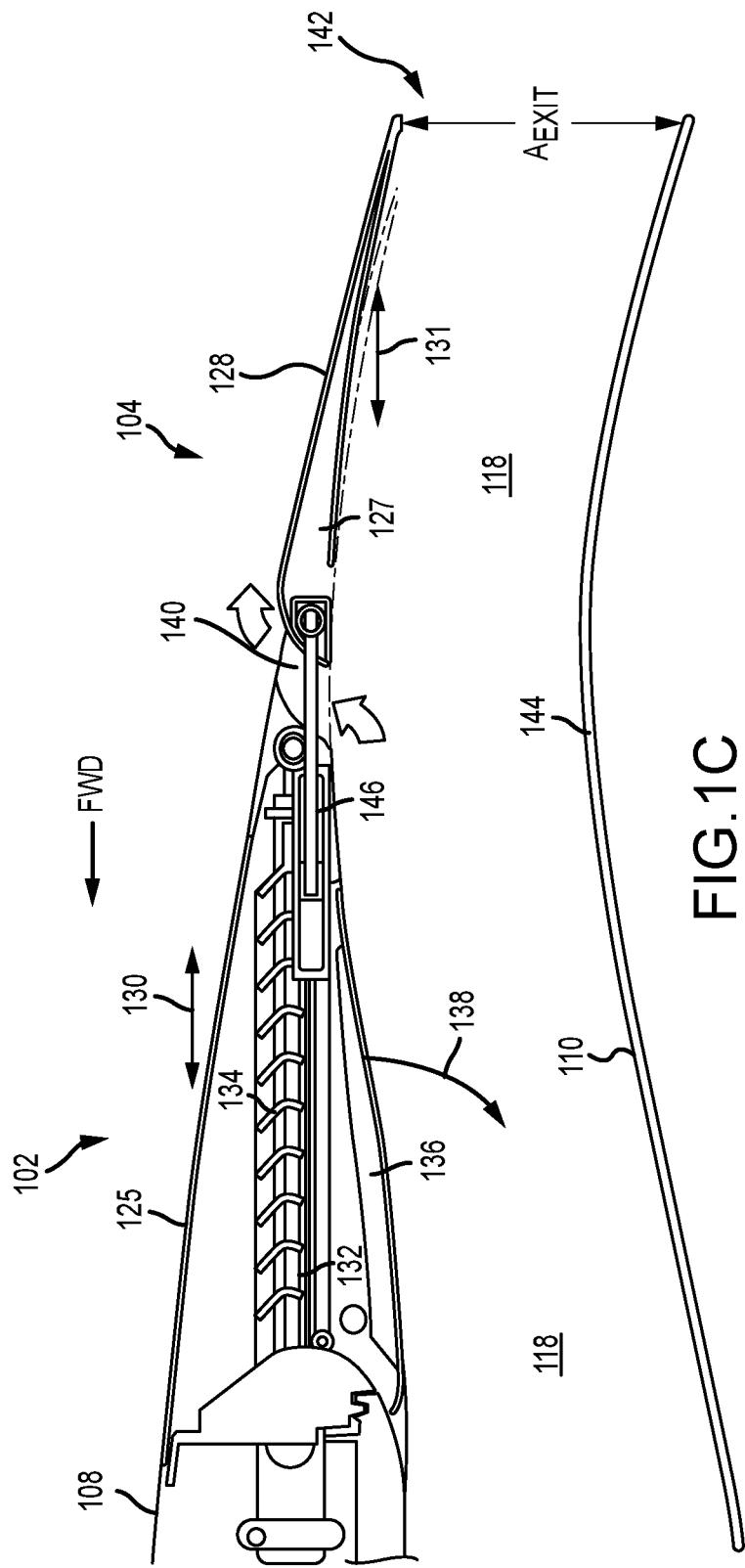

DRIVE SYSTEM FOR TRANSLATING STRUCTURE

FIELD

The present disclosure relates generally to nacelle systems and, more particularly, to translating components of nacelle systems and drive systems used to translate such components.

BACKGROUND

Modern aircraft typically utilize one or more gas turbine engines for propulsion. The engines may be housed in a nacelle, which may be wing-mounted, fuselage-mounted or tail-mounted or some combination thereof. Typical turbofan jet engines include a fan that draws and directs a flow of ambient air into the nacelle and into and around an engine core to form, respectively, a core engine flow and a bypass flow. The core engine flow is initially passed through a compressor and then through a combustor where a pressurized core engine flow is mixed with fuel and ignited. Combustion of the fuel and air mixture results in a stream of high temperature and high pressure gas that is used to rotate a turbine at the rear of the engine core. The compressor and the fan are then rotated via structure connecting these components with the rotating turbine. The gas exiting the turbine is thereafter directed through an exhaust nozzle at the rear of the engine and expelled to the atmosphere.

The bypass flow is directed about the engine core and constrained by an inner wall of the nacelle. In turbofan engines, the bypass flow typically provides the main thrust for an aircraft. The bypass flow may also be used to decelerate an aircraft after landing or during a rejected takeoff. Thrust reversers mounted in the structure of the nacelle selectively reverse the direction of the bypass flow via a cascade array to generate reverse thrust. One or more blocker doors may be situated aft of the cascade array and deployed into the bypass flow. Once deployed, the blocker doors redirect a portion of the bypass flow into and through the cascade array to produce a flow of high-velocity air having a vector component in the forward direction, reversing the thrust of the engine and thereby decelerating the aircraft.

During normal engine operation, the bypass flow exits the engine through a fan nozzle, typically disposed radially outward of the exhaust nozzle. Some aircraft nacelles have a variable area fan nozzle (VAFN) configured to slide, pivot or otherwise open to increase or decrease the area of an aft opening or openings through which the bypass flow may exit the nacelle. By selectively varying the exit area of the fan nozzle, various operating characteristics—e.g., the bypass ratio or the fan pressure ratio of the engine—may be adjusted to match a particular flight condition. VAFN structures are typically disposed aft of and connected to one or more translating sleeves of the thrust reverser.

SUMMARY

A system for a nacelle having a translating structure is disclosed. In various embodiments, the system includes a translating sleeve; a blocker door; a fixed structure; a primary hydraulic actuator configured to couple the fixed structure with the translating sleeve; a secondary hydraulic actuator configured to couple the blocker door with the translating sleeve; a first hydraulic supply line configured to fluidly couple a first fluid end of the primary hydraulic actuator to a first fluid end of the secondary hydraulic actuator; and a second hydraulic supply line configured to fluidly couple a second fluid end of the primary hydraulic actuator to a second fluid end of the secondary hydraulic actuator. In various embodiments, a sleeve actuator is configured to translate the translating sleeve with respect to the fixed structure.

In various embodiments, the primary hydraulic actuator comprises a primary cylinder, a primary piston and a primary rod, the primary rod having a first rod end attached to the primary piston and a second rod end attached to the fixed structure. In various embodiments, the secondary hydraulic actuator comprises a secondary cylinder, a secondary piston and a secondary rod, the secondary rod having a first rod end attached to the secondary piston and a second rod end attached to the blocker door.

In various embodiments, the first hydraulic supply line is configured to fluidly couple a first reservoir to the first fluid end of the primary hydraulic actuator and to the first fluid end of the secondary hydraulic actuator. In various embodiments, the second hydraulic supply line is configured to fluidly couple a second reservoir to the second fluid end of the primary hydraulic actuator and to the second fluid end of the secondary hydraulic actuator.

In various embodiments, a system includes a translating component configured for translating attachment to a nacelle component; a first primary hydraulic actuator; a second primary hydraulic actuator; a secondary hydraulic actuator configured to couple the translating component to the nacelle component; a first hydraulic supply line configured to fluidly couple a first fluid end of the secondary hydraulic actuator to the first primary hydraulic actuator; and a second hydraulic supply line configured to fluidly couple a second fluid end of the secondary hydraulic actuator to the second primary hydraulic actuator. In various embodiments, the nacelle component is a translating sleeve configured to translate with respect to a fixed structure. In various embodiments, a sleeve actuator is configured to translate the translating sleeve with respect to the fixed structure.

In various embodiments, the first primary hydraulic actuator comprises a first primary cylinder, a first primary piston and a first primary rod, the first primary rod having a first rod end attached to the first primary piston and a second rod end configured for releasable engagement with a first drive structure. In various embodiments, the second primary hydraulic actuator comprises a second primary cylinder, a second primary piston and a second primary rod, the second primary rod having a first rod end attached to the second primary piston and a second rod end configured for releasable engagement with a second drive structure.

In various embodiments, the first hydraulic supply line is configured to fluidly couple a first reservoir to the first fluid end of the secondary hydraulic actuator to the first primary hydraulic actuator. In various embodiments, the second hydraulic supply line is configured to fluidly couple a second reservoir to the second fluid end of the secondary hydraulic actuator to the second primary hydraulic actuator. In various embodiments, the first drive structure comprises a first master actuator attached to a fixed structure and the second drive structure comprises a second master actuator attached to the fixed structure.

A nacelle system having a translating structure is disclosed. In various embodiments, the nacelle system includes a fixed structure; a thrust reverser having a translating sleeve configured to translate relative to the fixed structure and in response to a first dual-circuit hydraulic system; and a variable area fan nozzle having a translating nozzle configured to translate relative to the translating sleeve and in response to a second dual-circuit hydraulic system.

In various embodiments, the first dual-circuit hydraulic system includes: a primary hydraulic actuator configured to couple the fixed structure with the translating sleeve; a secondary hydraulic actuator configured to couple a blocker door with the translating sleeve; a first hydraulic supply line configured to fluidly couple a first fluid end of the primary hydraulic actuator to a first fluid end of the secondary hydraulic actuator; and a second hydraulic supply line configured to fluidly couple a second fluid end of the primary hydraulic actuator to a second fluid end of the secondary hydraulic actuator. In various embodiments, a sleeve actuator is configured to translate the translating sleeve with respect to the fixed structure.

In various embodiments, the second dual-circuit hydraulic system includes: a first primary hydraulic actuator; a second primary hydraulic actuator; a secondary hydraulic actuator configured to couple the translating nozzle to the translating sleeve; a first hydraulic supply line configured to fluidly couple a first fluid end of the secondary hydraulic actuator to the first primary hydraulic actuator; and a second hydraulic supply line configured to fluidly couple a second fluid end of the secondary hydraulic actuator to the second primary hydraulic actuator.

In various embodiments, the first primary hydraulic actuator comprises a first primary cylinder, a first primary piston and a first primary rod, the first primary rod having a first rod end attached to the first primary piston and a second rod end configured for releasable engagement with a first master actuator attached to the fixed structure. In various embodiments, the second primary hydraulic actuator comprises a second primary cylinder, a second primary piston and a second primary rod, the second primary rod having a first rod end attached to the second primary piston and a second rod end configured for releasable engagement with a second master actuator attached to the fixed structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 1C is a close up cross sectional view of the translating cascade-type thrust reverser and the translating variable area fan nozzle illustrated in FIGS. 1A and 1B, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
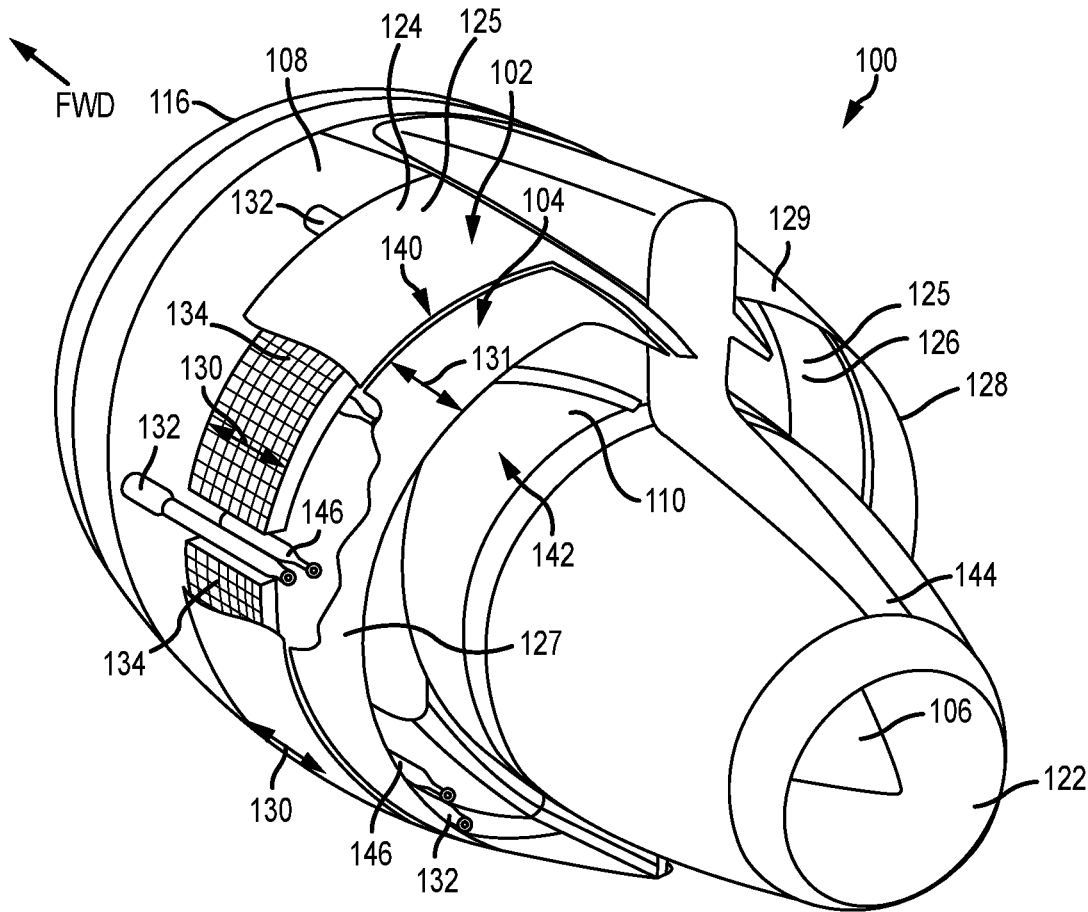
FIG. 1A is a perspective view of an aircraft engine having a translating cascade-type thrust reverser and a translating variable area fan nozzle, in accordance with various embodiments.
Figure 1B:
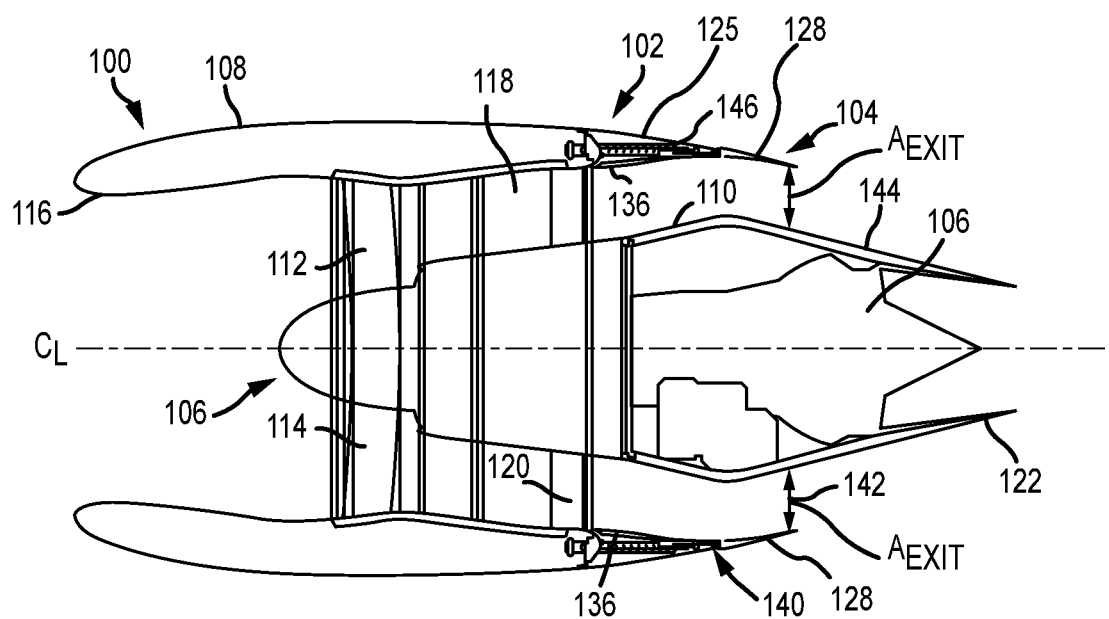
FIG. 1B is a cross sectional view of the aircraft engine illustrated in FIG. 1A, in accordance with various embodiments.

Referring now to the drawings, FIGS. 1A, 1B and 1C illustrate perspective and cross sectional views of an engine 100 having a thrust reverser 102 of the translating cascade-type and a variable area fan nozzle 104 of the translating-type, in accordance with various embodiments. The thrust reverser 102 and the variable area fan nozzle 104 are shown in the stowed and closed positions, respectively. As illustrated, the engine 100 includes an engine core 106 and a nacelle 108 surrounding the engine core 106. The engine core 106 is at least partially housed within an inner fixed structure 110. A fan 112 is positioned within an upstream portion of the nacelle 108 and includes a plurality of fan blades 114 that are mounted on a rotor. The fan 112 rotates about an engine centerline CL, and draws a flow of air through an inlet 116 of the nacelle 108. A bypass duct 118 is defined between the engine core 106 and the nacelle 108. The air flow drawn into the engine 100 via the inlet 116 of the nacelle 108 is accelerated by the fan 112, and a portion of the incoming air flow is directed into and through the engine core 106 as a core engine flow. A bypass flow enters the upstream end of the nacelle 108 and flows around and past the engine core 106 and the inner fixed structure 110. The bypass flow is accelerated by the fan 112, then passes through the bypass duct 118, which may include one or more stators 120, and then exits the engine 100 through the variable area fan nozzle 104. At the same time, a high-pressure and high-temperature exhaust stream exits the engine core 106 through an exhaust nozzle 122 located at the aft end of the engine 100.

Still referring to FIGS. 1A, 1B and 1C, the thrust reverser 102 may be positioned forward of the variable area fan nozzle 104. More specifically, in various embodiments, the thrust reverser 102 includes one or more translating sleeves 125, such as, for example, a first translating sleeve 124 and a second translating sleeve 126 positioned opposite the first translating sleeve 124, with both translating sleeves positioned forward of a translating nozzle 128 of the variable area fan nozzle 104. The first translating sleeve 124 and the second translating sleeve 126 are configured to translate in the fore and aft directions (as indicated by the bidirectional arrow 130) and are operated by a sleeve actuator 132 (or a plurality of sleeve actuators spaced circumferentially about the engine 100). The translating sleeves 125, when in the stowed configuration, cover a cascade array 134 (or an array of cascade vanes). Translation of the translating sleeves 125 in the aft direction to a deployed configuration results in deployment of a blocker door 136 (or a plurality of blocker doors spaced circumferentially about the engine 100), as indicated by the directional arrow 138 in FIG. 1C. Deployment of the blocker door 136 into the bypass duct 118 causes a portion of the bypass flow to exit the bypass duct 118 through the cascade array 134, which turns the exiting flow in a generally forward direction to create reverse thrust.

The translating nozzle 128 of the variable area fan nozzle 104 may be selectively adjusted as the engine 100 operates under different flight conditions. As discussed above, such an adjustment may be used to match engine performance to particular flight conditions. As shown in FIG. 1B, the translating nozzle 128 may be selectively translated (e.g., moved fore and aft) to vary the exit area "$A_{EXIT}$" of the exit of the variable area fan nozzle 104 (or a primary fan nozzle exit 142) and to adjust an amount of the bypass flow spilled through an upstream exit 140 formed by a gap between the translating nozzle 128 and the translating sleeves 125. By bleeding or "spilling off" excess bypass flow through the upstream exit 140, before the bypass flow reaches the primary fan nozzle exit 142, lower fan pressure ratios for the same amount of delivered mass flow may be obtained, thereby increasing stall margins and avoiding the potential for engine malfunction or shutdown. For purposes of illustration, the variable area fan nozzle 104 is shown in the context of a turbofan jet aircraft engine. Further, in various embodiments, the engine 100, having one or both of the thrust reverser 102 and the variable area fan nozzle 104, may be mounted to a wing or fuselage of an aircraft, for example, by a pylon or other similar support. In addition, while the disclosure that follows focuses primarily on the thrust reverser 102 and the variable area fan nozzle 104, the disclosure contemplates the systems and methods described herein to apply to any translating component, including, for example, and without limitation, translating nacelle inlet and exit components or surfaces and translating control surface components or surfaces, as well as components or surfaces associated with thrust reversers and variable area fan nozzles.

In various embodiments, the translating nozzle 128 is an annular airfoil-like structure mounted proximate the trailing edge of the one or more translating sleeves 125 (e.g., the first translating sleeve 124 and the second translating sleeve 126) that circumscribe an engine core cowl 144 or the inner fixed structure 110 immediately aft of the nacelle 108. Due to the longitudinal variations in the diameter of the engine core cowl 144, selective fore and aft movement of the translating nozzle 128 changes the size of the exit area $A_{EXIT}$ of the primary fan nozzle exit 142. As shown in FIG. 1A, the translating nozzle 128 can include a first nozzle section 127 and a second nozzle section 129, each being generally arcuate in shape and configured to translate in the axial direction (as indicated by the bidirectional arrow 131). Translation of the translating nozzle 128 affects a desired size of the upstream exit 140, and also varies the outlet geometry and the exit area $A_{EXIT}$ of the primary fan nozzle exit 142. Hence, when the translating nozzle 128 is deployed, there is an increase in the bypass flow that is discharged from the engine 100 through both the upstream exit 140 and the primary fan nozzle exit 142, which is enlarged as the translating nozzle 128 translates in the aft direction. As illustrated in FIGS. 1A-1C, the translating nozzle 128 may be selectively translated fore and aft by, for example, a nozzle actuator 146 (or a plurality of nozzle actuators spaced circumferentially about the engine 100).

Figure 2A:
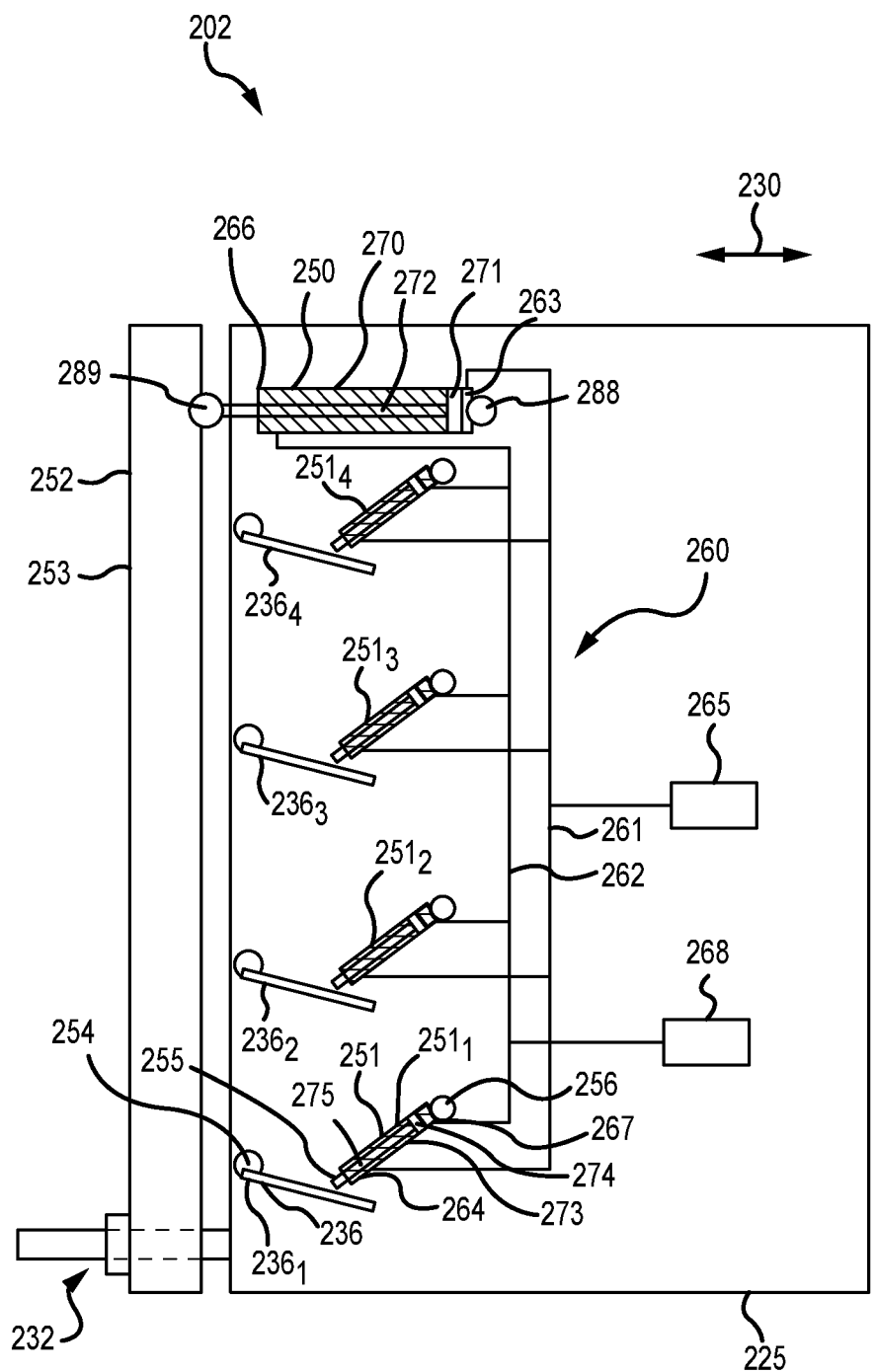
FIG. 2A is a schematic view of a translating thrust reverser in a stowed configuration and a drive system configured to translate a translating sleeve of the thrust reverser, in accordance with various embodiments.
Figure 2B:
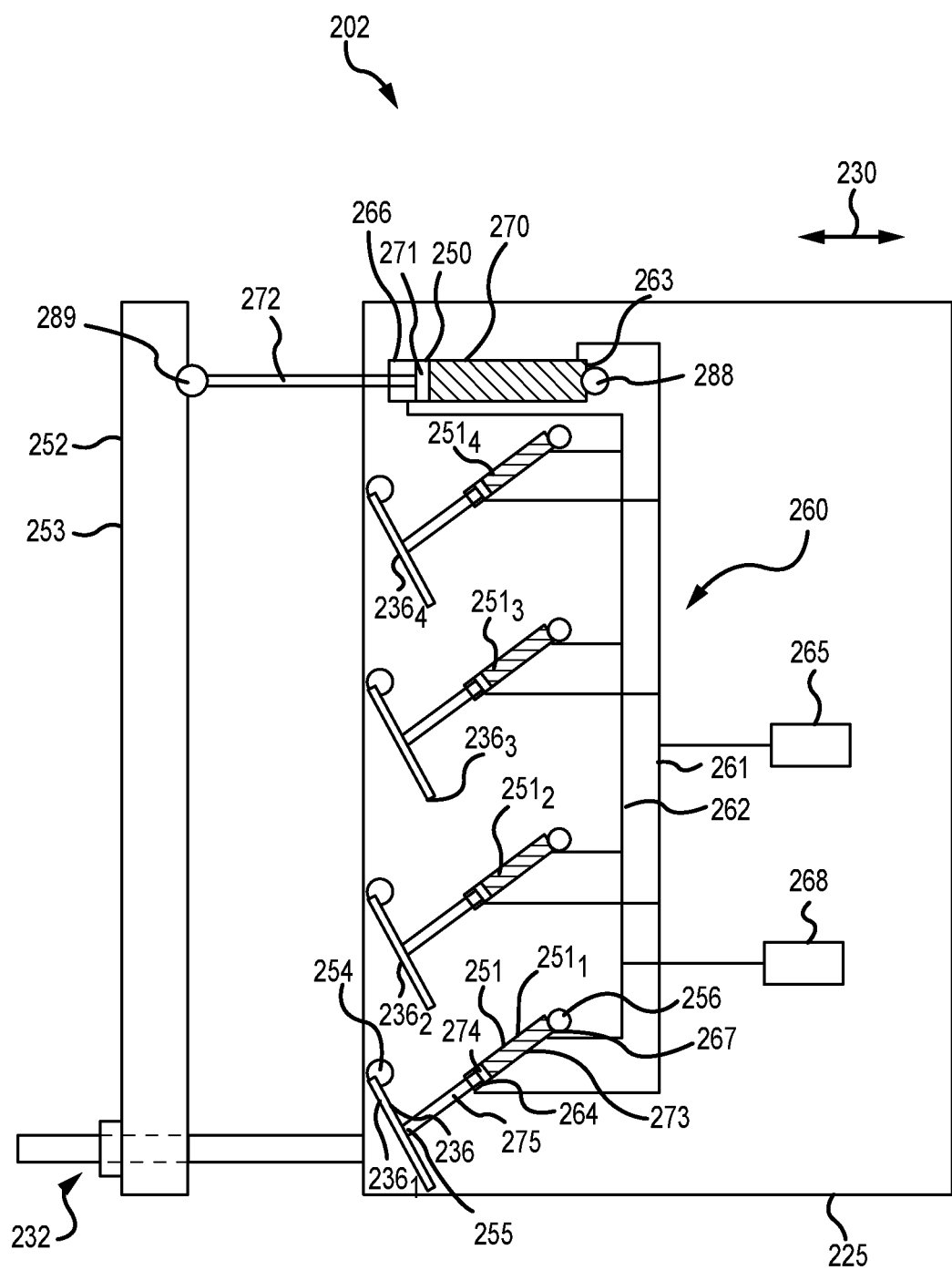
FIG. 2B is a schematic view of a translating thrust reverser in a deployed configuration and a drive system configured to translate a translating sleeve of the thrust reverser, in accordance with various embodiments.

Referring now to FIGS. 2A and 2B, schematic views of a thrust reverser 202 configured to translate between a stowed configuration and a deployed configuration, respectively, are provided. In various embodiments, the thrust reverser 202 includes a translating sleeve 225 configured to translate in fore and aft directions (as indicated by the bidirectional arrow 230) and is operated by a sleeve actuator 232, which may comprise any suitable actuation system (or main actuator) capable of driving a rapid translation of the translating sleeve 225 for deployment of the thrust reverser, such as, for example, a ball screw mechanism or a hydraulic cylinder. In various embodiments, the sleeve actuator 232 is connected between a fixed structure 252, such as, for example, a torque box 253, and the translating sleeve 225. In various embodiments, the thrust reverser 202 includes a blocker door 236, similar to the blocker door 136 described above with reference to FIGS. 1B and 1C. As also described above, the blocker door 236 is configured to block a portion of a bypass flow when the thrust reverser 202 assumes a deployed configuration. A primary hydraulic actuator 250 (or a master actuator) is connected between the fixed structure 252 and the translating sleeve 225. A secondary hydraulic actuator 251 (or a slave actuator or a slave cylinder) is connected between the translating sleeve 225 and the blocker door 236. While, for clarity, the disclosure generally focuses on operation of the blocker door 236 and the secondary hydraulic actuator 251, it shall be appreciated, as illustrated in FIGS. 2A and 2B, that the thrust reverser 202 may include a plurality of blocker doors (e.g., a first blocker door $236_1$, a second blocker door $236_2$, a third blocker door $236_3$ and a fourth blocker door $236_4$) operated by a plurality of secondary hydraulic actuators (e.g., a first secondary hydraulic actuator $251_1$, a second secondary hydraulic actuator $251_2$, a third secondary hydraulic actuator $251_3$ and a fourth secondary hydraulic actuator $251_4$).

In various embodiments, the blocker door 236 may be coupled at a first hinge 254 (or a first joint) to the translating sleeve 225 and at a second hinge 255 (or a second joint) to the secondary hydraulic actuator 251. The secondary hydraulic actuator 251 may be coupled as well to the translating sleeve 225 at any suitable location, such as at a third hinge 256 (or a third joint). Each of the first hinge 254, the second hinge 255 and the third hinge 256 is configured to enable the blocker door 236 to pivot substantially radially inward toward an inner fixed structure, such as, for example, the inner fixed structure 110 described above with reference to FIGS. 1B and 1C, as the blocker door 236 is deployed. In various embodiments, the primary hydraulic actuator 250 is coupled to the translating sleeve 225 at a fourth hinge 288 (or a fourth joint) and to the fixed structure 252 at a fifth hinge 289 (or a fifth joint).

With continued reference to FIGS. 2A and 2B, the thrust reverser 202 includes a thrust reverser hydraulic circuit 260 (or a drive system) configured to drive or otherwise operate the thrust reverser 202. The thrust reverser hydraulic circuit 260 includes a first hydraulic supply line 261 and a second hydraulic supply line 262. In various embodiments, the combination of the first hydraulic supply line 261 and the second hydraulic supply line 262, together with the various actuators and related components described herein, constitute a first dual-circuit hydraulic system. In various embodiments, the first hydraulic supply line 261 couples a first fluid end 263 of the primary hydraulic actuator 250 (e.g., a cylinder within the primary hydraulic actuator) to a first fluid end 264 of the secondary hydraulic actuator 251 (e.g., a cylinder within the secondary hydraulic actuator). The first hydraulic supply line 261 is further coupled to a first reservoir 265 which, in various embodiments, may be pressurized. Similarly, in various embodiments, the second hydraulic supply line 262 couples a second fluid end 266 of the primary hydraulic actuator 250 (e.g., a cylinder within the primary hydraulic actuator) to a second fluid end 267 of the secondary hydraulic actuator 251 (e.g., a cylinder within the secondary hydraulic actuator). The second hydraulic supply line 262 is further coupled to a second reservoir 268 which, in various embodiments, may be pressurized. In various embodiments, the primary hydraulic actuator 250 includes a cylinder 270 (or a primary cylinder), a piston 271 (or a primary piston) disposed to slide within the cylinder 270 (e.g., between the first fluid end 263 and the second fluid end 266) and a rod 272 (or a primary rod) having a first rod end attached to the piston 271 and a second rod end attached to the fixed structure 252. Similarly, the secondary hydraulic actuator 251 includes a cylinder 273 (or a secondary cylinder), a piston 274 (or a secondary piston) disposed to slide within the cylinder 273 (e.g., between the first fluid end 264 and the second fluid end 267) and a rod 275 (or a secondary rod) having a first rod end attached to the piston 274 and a second rod end attached to the blocker door 236.

Referring to FIG. 2A, the thrust reverser 202 is illustrated in a stowed configuration. In the stowed configuration, the blocker door 236 assumes a raised position, such that the blocker door 236 does not generally interfere with a bypass flow. In this configuration, the piston 271 of the primary hydraulic actuator 250 is positioned substantially toward the first fluid end 263 of the cylinder 270 and hydraulic fluid substantially fills the cylinder 270 between the piston 271 and the second fluid end 266 of the cylinder 270 (or of the primary hydraulic actuator 250). Similarly, in the stowed configuration, the piston 274 of the secondary hydraulic actuator 251 is positioned substantially toward the second fluid end 267 of the cylinder 273 (or of the secondary hydraulic actuator 251) and hydraulic fluid substantially fills the cylinder 273 between the piston 274 and the first fluid end 264 of the cylinder 273 (or of the secondary hydraulic actuator 251). Referring to FIG. 2B, the thrust reverser 202 is illustrated in a deployed configuration. In the deployed configuration, the blocker door 236 assumes a lowered position, such that the blocker door 236 extends into and interferes with (e.g., blocks) a bypass flow. In this configuration, the piston 271 of the primary hydraulic actuator 250 is positioned substantially toward the second fluid end 266 of the cylinder 270 and hydraulic fluid substantially fills the cylinder 270 between the piston 271 and the first fluid end 263 of the cylinder 270. Similarly, in the deployed configuration, the piston 274 of the secondary hydraulic actuator 251 is positioned substantially toward the first fluid end 264 of the cylinder 273 and hydraulic fluid substantially fills the cylinder 273 between the piston 274 and the second fluid end 267 of the cylinder 273.

During operation, for example when transitioning the thrust reverser 202 from the stowed configuration to the deployed configuration, the sleeve actuator 232 drives the translating sleeve 225 a distance away from the fixed structure 252 until the translating sleeve 225 assumes the deployed configuration. Driving the translating sleeve 225 from the stowed configuration (as illustrated in FIG. 2A) to the deployed configuration (as illustrated in FIG. 2B) causes the piston 271 of the primary hydraulic actuator 250 to move from the first fluid end 263 of the cylinder 270 to the second fluid end 266 of the cylinder 270. This, in turn, forces hydraulic fluid out the primary hydraulic actuator 250 at the second fluid end 266 of the cylinder 270, into the second hydraulic supply line 262 and into the secondary hydraulic actuator 251 at the second fluid end 267 of the cylinder 273. Forcing hydraulic fluid into the secondary hydraulic actuator 251 at the second fluid end 267 of the cylinder 273, in turn, causes the piston 274 to move from the second fluid end 267 of the cylinder 273 to the first fluid end 264 of the cylinder 273, thereby forcing the blocker door 236 into its deployed configuration. At the same time (i.e., during the transition from the stowed configuration to the deployed configuration), hydraulic fluid in the secondary hydraulic actuator 251, between the piston 274 and the first fluid end 264 of the cylinder 273, is forced out of the secondary hydraulic actuator 251 at the first fluid end 264 of the cylinder 273, into the first into the first hydraulic supply line 261 and into the primary hydraulic actuator 250 at the first fluid end 263 of the cylinder 270.

When transitioning the thrust reverser 202 from the deployed configuration to the stowed configuration, the sleeve actuator 232 drives the translating sleeve 225 the distance back to the fixed structure 252 until the translating sleeve 225 assumes the stowed configuration. Driving the translating sleeve 225 from the deployed configuration (as illustrated in FIG. 2B) to the stowed configuration (as illustrated in FIG. 2A) causes the piston 271 of the primary hydraulic actuator 250 to move from the second fluid end 266 of the cylinder 270 to the first fluid end 263 of the cylinder 270. This, in turn, causes the flows of hydraulic fluid within the first hydraulic supply line 261 and the second hydraulic supply line 262, as described above, to be reversed, thereby forcing the blocker door 236 to return to the stowed configuration. In various embodiments, the first reservoir 265 and the second reservoir 268 may be pressurized by, for instance, forming the reservoirs as hydraulic accumulators, to facilitate or accelerate stowage of one or more blocker doors. Pressurization of the first reservoir 265 may, for example, apply a pre-load to the blocker door 236 in order to force the blocker door 236 to remain closed (i.e., stowed) during flight, thereby preventing the blocker door 236 from opening inadvertently and creating drag within the bypass air flow duct. Additionally, while the disclosure generally focuses on hydraulic circuits and systems for operating the various actuators, the disclosure contemplates other suitable fluids, including pneumatic fluids under pressure, to operate the various components. Thus, the term hydraulic fluids should be interpreted broadly to include all such fluids, liquid or gaseous, capable of being used to operate the actuators described in the various embodiments.

Figure 3A:
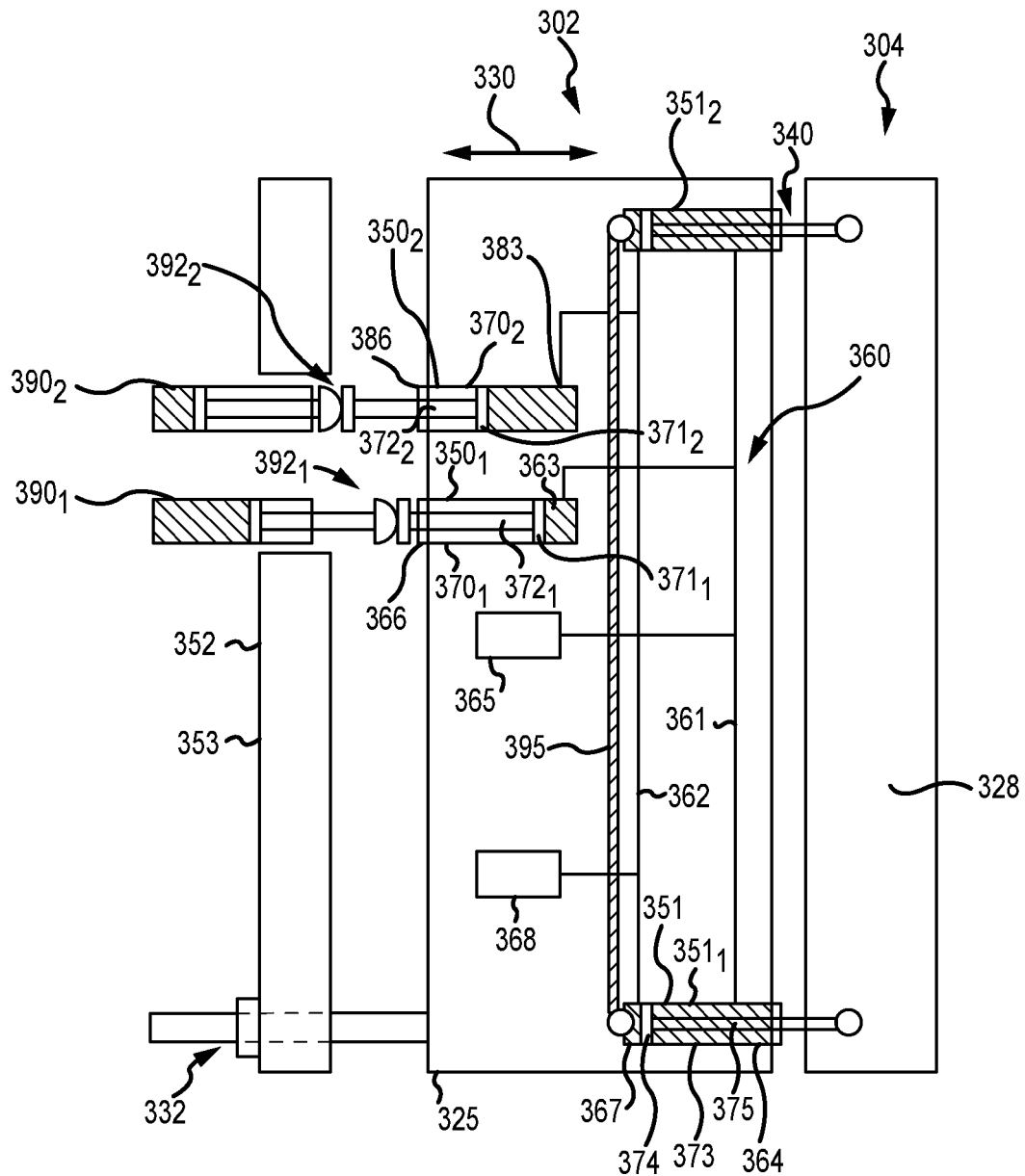
FIG. 3A is a schematic view of a translating thrust reverser in a stowed configuration, a variable area fan nozzle in a closed position and a drive system configured to translate a translating nozzle of the variable area fan nozzle, in accordance with various embodiments.
Figure 3B:
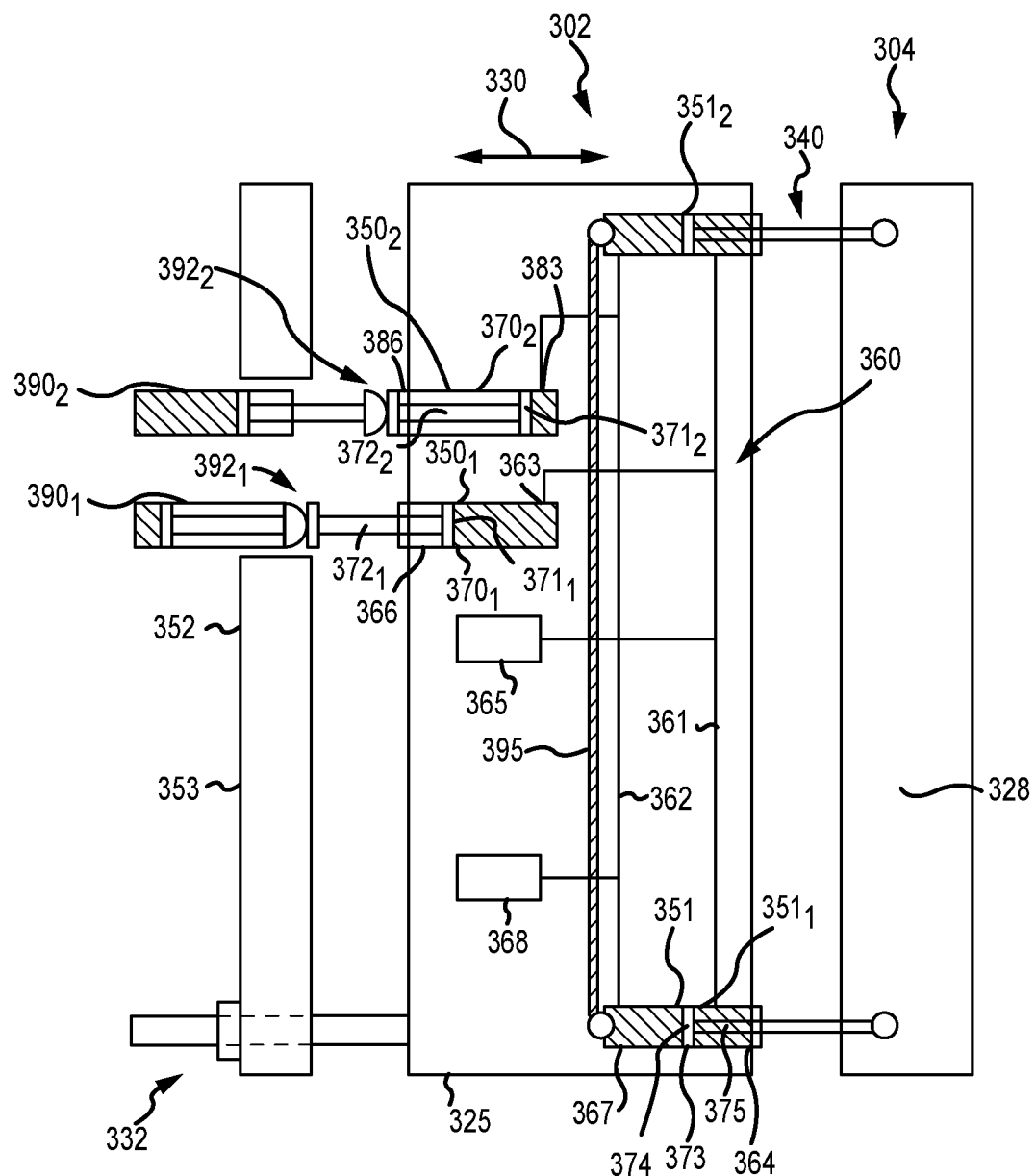
FIG. 3B is a schematic view of a translating thrust reverser in a stowed configuration, a variable area fan nozzle in an open position and a drive system configured to translate a translating nozzle of the variable area fan nozzle, in accordance with various embodiments.
Figure 3C:
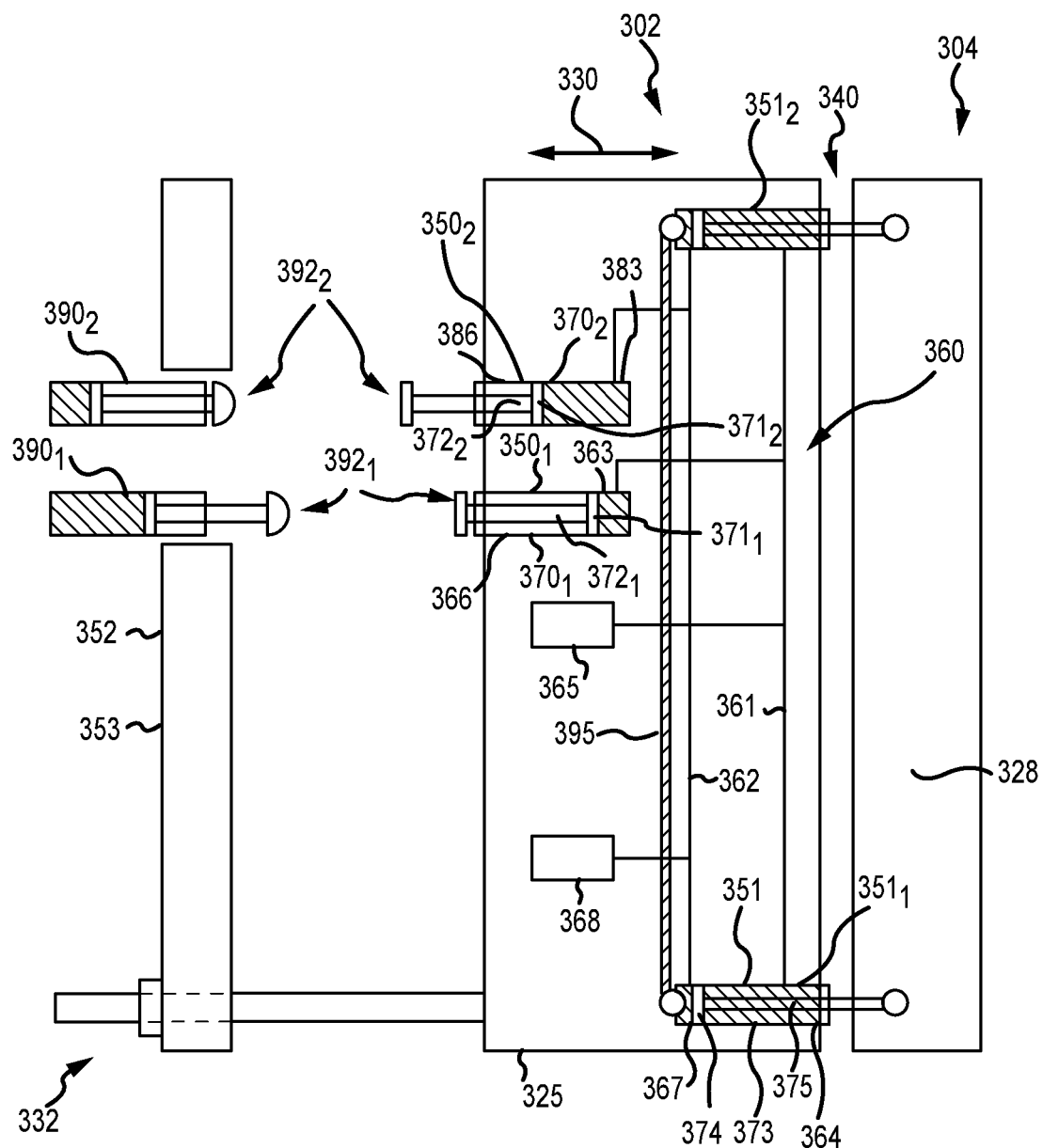
FIG. 3C is a schematic view of a translating thrust reverser in a deployed configuration, a variable area fan nozzle in a closed position and a drive system configured to translate a translating nozzle of the variable area fan nozzle, in accordance with various embodiments.

Referring now to FIGS. 3A, 3B and 3C, schematic views of a nacelle system for a gas turbine engine are provided. In accordance with various embodiments, the nacelle system includes a thrust reverser 302, configured to translate between a stowed configuration and a deployed configuration via a first hydraulic system (e.g., the thrust reverser hydraulic circuit 260 described above with reference to FIGS. 2A and 2B)), and a variable area fan nozzle 304, also configured to translate between a stowed configuration and a deployed configuration via a second hydraulic system (e.g., a variable area fan nozzle hydraulic circuit 360 described below). In various embodiments, the thrust reverser 302 includes a translating sleeve 325 configured to translate in fore and aft directions (as indicated by the bidirectional arrow 330) and is operated by a sleeve actuator 332, which may comprise any suitable actuation system capable of driving a rapid translation of the translating sleeve 325 for deployment of the thrust reverser, such as, for example, a ball screw mechanism or a hydraulic cylinder. In various embodiments, the sleeve actuator 332 is connected between a fixed structure 352, such as, for example, a torque box 353, and the translating sleeve 325. Otherwise, in various embodiments, the thrust reverser 302 shares the same construction and operational characteristics as the thrust reverser 202 described above with reference to FIGS. 2A and 2B. Accordingly, for brevity, such construction and operational characteristics are not repeated here, unless otherwise helpful in describing construction and operation of the variable area fan nozzle 304.

In various embodiments, the variable area fan nozzle 304 includes a translating nozzle 328, similar to the translating nozzle 128 described above with reference to FIGS. 1A, 1B and 1C. As also described above, the translating nozzle 328 is configured for selective translation (e.g., moved fore and aft) to vary an exit area "$A_{EXIT}$" of the exit of the variable area fan nozzle 304 (or a primary fan nozzle exit) and to adjust an amount of the bypass flow spilled through an upstream exit 340 formed by a gap between the translating nozzle 328 and the translating sleeve 325 (or another nacelle component that may or may not be stationary with respect to a fixed structure on the nacelle). A first primary hydraulic actuator $350_1$ (or a first master actuator) and a second primary hydraulic actuator $350_2$ (or a second master actuator) are connected proximate the fixed structure 352 and to the translating sleeve 325. A secondary hydraulic actuator 351 (or a slave actuator or a slave cylinder) is connected to the translating sleeve 325 and to the translating nozzle 328. While, for clarity, the disclosure generally focuses on operation of the translating nozzle 328 and the secondary hydraulic actuator 351, it shall be appreciated, as illustrated in FIGS. 3A, 3B and 3C, that the variable area fan nozzle 304 may include a plurality of nozzle sections (e.g., the first nozzle section 127 and the second nozzle section 129 described above with reference to FIG. 1A), each of which may be operated by a plurality of secondary hydraulic actuators (e.g., a first secondary hydraulic actuator $351_1$ and a second secondary hydraulic actuator $351_2$). Further, each of the first secondary hydraulic actuator $351_1$ and the second secondary hydraulic actuator $351_2$, may, in various embodiments, be connected via a synchronization shaft 395 to facilitate synchronized operation of the first secondary hydraulic actuator $351_1$ with the second secondary hydraulic actuator $351_2$.

With continued reference to FIGS. 3A, 3B and 3C, the variable area fan nozzle 304 includes a variable area fan nozzle hydraulic circuit 360 (or a drive system) configured to drive or otherwise operate the variable area fan nozzle 304. The variable area fan nozzle hydraulic circuit 360 includes a first hydraulic supply line 361 and a second hydraulic supply line 362. In various embodiments, the combination of the first hydraulic supply line 361 and the second hydraulic supply line 362, together with the various actuators and related components described herein, constitute a second dual-circuit hydraulic system. In various embodiments, the first hydraulic supply line 361 couples a first fluid end 363 of the first primary hydraulic actuator $350_1$ to a first fluid end 364 of the secondary hydraulic actuator 351. The first hydraulic supply line 361 is further coupled to a first reservoir 365 which, in various embodiments, may be pressurized. Similarly, in various embodiments, the second hydraulic supply line 362 couples a first fluid end 383 of the second primary hydraulic actuator $350_2$ to a second fluid end 367 of the secondary hydraulic actuator 351. The second hydraulic supply line 362 is further coupled to a second reservoir 368 which, in various embodiments, may be pressurized. In various embodiments, the first primary hydraulic actuator $350_1$ includes a cylinder $370_1$ (or a first primary cylinder), a piston $371_1$ (or a first primary piston) disposed to slide within the cylinder $370_1$ (e.g., between the first fluid end 363 and a second fluid end 366) and a rod $372_1$ (or a first primary rod) having a first rod end attached to the piston $371_1$ and a second rod end releasably attached to a first master actuator $390_1$ (or a first drive structure), which is attached to the fixed structure 352. In similar fashion, the second primary hydraulic actuator $350_2$ includes a cylinder $370_2$ (or a second primary cylinder), a piston $371_2$ (or a second primary piston) disposed to slide within the cylinder $370_2$ (e.g., between the first fluid end 383 and a second fluid end 386) and a rod $372_2$ (or a second primary rod) having a first rod end attached to the piston $371_2$ and a second rod end releasably attached to a second master actuator $390_2$ (or a second drive structure), which is attached to the fixed structure 352. The secondary hydraulic actuator 351 includes a cylinder 373, a piston 374 disposed to slide within the cylinder 373 (e.g., between the first fluid end 364 and the second fluid end 367) and a rod 375 having a first rod end attached to the piston 374 and a second rod end attached to the translating nozzle 328.

Referring to FIG. 3A, the variable area fan nozzle 304 is illustrated in a closed or nearly closed configuration. In the closed configuration, the translating nozzle 328 assumes a position aft of a trailing end of the translating sleeve 325 such that the upstream exit 340 is completely closed or otherwise open only a nominal amount. In this configuration, the piston $371_1$ of the first primary hydraulic actuator $350_1$ is positioned substantially toward the first fluid end 363 of the cylinder $370_1$, leaving the cylinder $370_1$ substantially empty of hydraulic fluid between the piston $371_1$ and the second fluid end 366. Also in this configuration, the piston $371_2$ of the second primary hydraulic actuator $350_2$ is positioned substantially toward the second fluid end 386 of the cylinder $370_2$, leaving the cylinder $370_2$ substantially filled with hydraulic fluid between the piston $371_2$ and the first fluid end 383. Similarly, in the closed configuration, the piston 374 of the secondary hydraulic actuator 351 is positioned substantially toward the second fluid end 367 of the cylinder 373 and hydraulic fluid substantially fills the cylinder 373 between the piston 374 and the first fluid end 364 of the cylinder 373. Referring to FIG. 3B, the variable area fan nozzle 304 is illustrated in an open configuration. In the open configuration, the translating nozzle 328 assumes a position aft of the trailing end of the translating sleeve 325 such that the upstream exit 340 is open an amount greater than the completely closed or nominally open positions such that a portion of the bypass flow is spilled through the upstream exit 340 between the translating nozzle 328 and the translating sleeve 325. In this configuration, the piston $371_1$ of the first primary hydraulic actuator $350_1$ is positioned substantially toward the second fluid end 366 of the cylinder $370_1$, leaving the cylinder $370_1$ substantially filled with hydraulic fluid between the piston $371_1$ and the first fluid end 363. Also in this configuration, the piston $371_2$ of the second primary hydraulic actuator $350_2$ is positioned substantially toward the first fluid end 383 of the cylinder $370_2$, leaving the cylinder $370_2$ substantially empty of hydraulic fluid between the piston $371_2$ and the second fluid end 386. Similarly, in the closed configuration, the piston 374 of the secondary hydraulic actuator 351 is positioned substantially toward the first fluid end 364 of the cylinder 373 and hydraulic fluid substantially fills the cylinder 373 between the piston 374 and the second fluid end 367 of the cylinder 373.

During operation, for example, when transitioning the variable area fan nozzle 304 from the closed configuration to the open configuration, the second master actuator $390_2$ drives the piston $371_2$ of the second primary hydraulic actuator $350_2$ to move from the second fluid end 386 of the cylinder $370_2$ to the first fluid end 383 of the cylinder $370_2$. This, in turn, forces hydraulic fluid out the second primary hydraulic actuator $350_2$ at the first fluid end 383 of the cylinder $370_2$, into the second hydraulic supply line 362 and into the secondary actuator 351 at the second fluid end 367 of the cylinder 373. Forcing hydraulic fluid into the secondary hydraulic actuator 351 at the second fluid end 367 of the cylinder 373, in turn, causes the piston 374 to move from the second fluid end 367 of the cylinder 373 to the first fluid end 364 of the cylinder 373, thereby forcing the translating nozzle 328 to translate aft of a trailing end of the translating sleeve 325. At the same time (i.e., during the transition from the closed configuration to the open configuration), hydraulic fluid in the secondary hydraulic actuator 351, between the piston 374 and the first fluid end 364 of the cylinder 373, is forced out the secondary hydraulic actuator 351 at the first fluid end 364 of the cylinder 373, into the first hydraulic supply line 361 and into the first primary hydraulic actuator $350_1$ at the first fluid end 363 of the cylinder $370_1$. This drives the piston $371_1$ from the first fluid end 363 of the cylinder $370_1$ to the second fluid end 366 of the cylinder $370_1$, which thereby drives the first master actuator $390_1$ to a stowed state, while the second master actuator $390_2$ assumes a deployed state.

When transitioning the variable area fan nozzle 304 from the open configuration to the closed configuration, the first master actuator $390_1$ drives the piston $371_1$ of the first primary hydraulic actuator $350_1$ to move from the second fluid end 366 of the cylinder $370_1$ to the first fluid end 363 of the cylinder $370_1$. This, in turn, causes the flows of hydraulic fluid within the first hydraulic supply line 361 and the second hydraulic supply line 362, as described above, to be reversed, thereby forcing the translating nozzle 328 to return to the closed position. In various embodiments, the first reservoir 365 and the second reservoir 368 may be pressurized by, for instance, forming the reservoirs as hydraulic accumulators, to facilitate or accelerate translation of the translating nozzle 328. Pressurization of the first reservoir 365 may, for example, apply a pre-load to the translating nozzle 328 in order to bias the translating nozzle 328 to remain closed during flight unless purposefully actuated.

Still referring to FIGS. 3A, 3B and 3C, the variable area fan nozzle 304 includes a decoupling system configured to decouple the first primary hydraulic actuator $350_1$ from the first master actuator $390_1$ and the second primary hydraulic actuator $350_2$ from the second master actuator $390_2$ upon activation of the thrust reverser 302 from a stowed configuration to a deployed configuration. In various embodiments, for example, both the first primary hydraulic actuator $350_1$ and the first master actuator $390_1$ remain in contact via a first coupling component $392_1$ which, in various embodiments, includes a first contact member connected to the first primary hydraulic actuator $350_1$ and a second contact member connected to the first master actuator $390_1$. The second coupling component $392_2$ is similarly constructed. Comparing FIGS. 3A and 3B with FIG. 3C, the first coupling component $392_1$ and the second coupling component $392_2$ enable continual operational contact between the first primary hydraulic actuator $350_1$ and the first master actuator $390_1$ and between the second primary hydraulic actuator $350_2$ and the second master actuator $390_2$ regardless of the configuration of the variable area fan nozzle 304, so long as the thrust reverser assumes a stowed configuration. Upon activation of the thrust reverser 302, however, from a stowed configuration to a deployed configuration, the first coupling component $392_1$ and the second coupling component $392_2$ function to separate the first primary hydraulic actuator $350_1$ from the first master actuator $390_1$ and the second primary hydraulic actuator $350_2$ from the second master actuator $390_2$, thereby deactivating the variable area fan nozzle 304 and preventing translation of the translating nozzle 328 during such time the thrust reverser 302 assumes a deployed state. Additionally, while the disclosure generally focuses on hydraulic circuits and systems for operating the various actuators, the disclosure contemplates other suitable fluids, including pneumatic fluids under pressure, to operate the various components. Thus, the term hydraulic fluids should be interpreted broadly to include all such fluids, liquid or gaseous, capable of being used to operate the actuators described in the various embodiments.

Figure 4A:
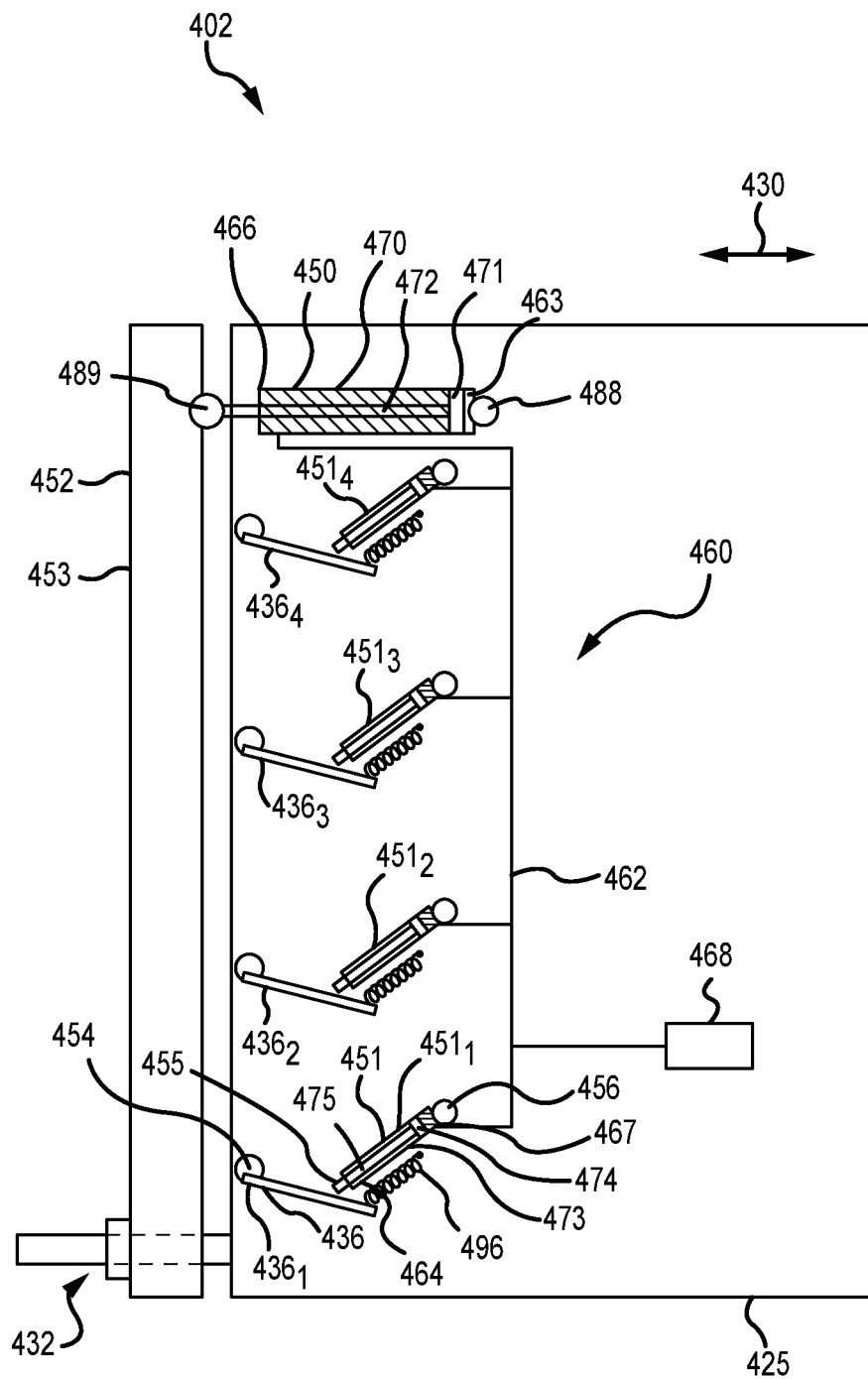
FIG. 4A is a schematic view of a translating thrust reverser in a stowed configuration and a drive system configured to translate a translating sleeve of the thrust reverser, in accordance with various embodiments.
Figure 4B:
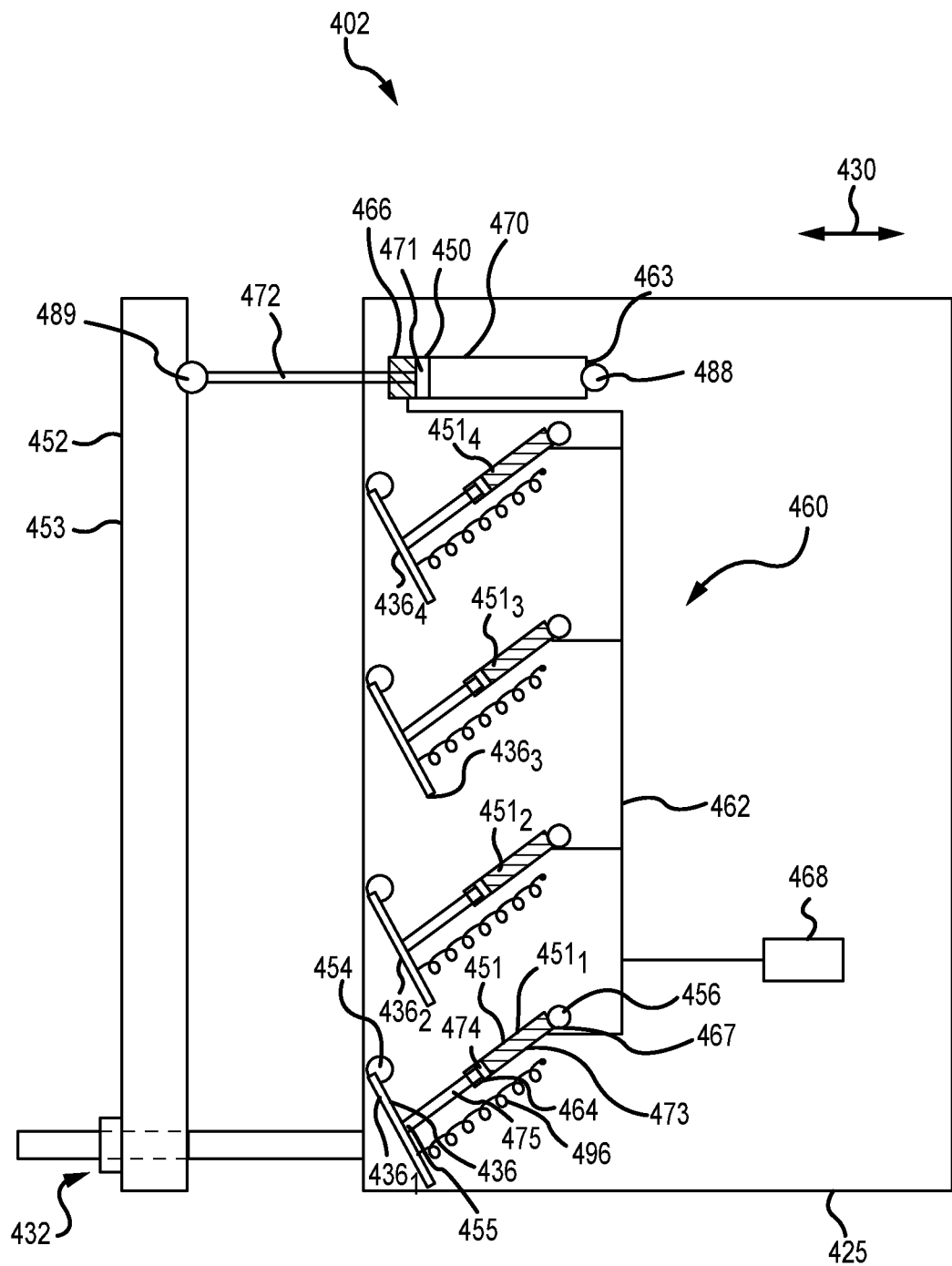
FIG. 4B is a schematic view of a translating thrust reverser in a deployed configuration and a drive system configured to translate a translating sleeve of the thrust reverser, in accordance with various embodiments.

Referring now to FIGS. 4A and 4B, schematic views of a thrust reverser 402 configured to translate between a stowed configuration and a deployed configuration, respectively, are provided. In various embodiments, the thrust reverser 402 includes a translating sleeve 425 configured to translate in fore and aft directions (as indicated by the bidirectional arrow 430) and is operated by a sleeve actuator 432, which may comprise any suitable actuation system (or main actuator) capable of driving a rapid translation of the translating sleeve 425 for deployment of the thrust reverser, such as, for example, a ball screw mechanism or a hydraulic cylinder. In various embodiments, the sleeve actuator 432 is connected between a fixed structure 452, such as, for example, a torque box 453, and the translating sleeve 425. In various embodiments, the thrust reverser 402 includes a blocker door 436, similar to the blocker door 136 described above with reference to FIGS. 1B and 1C. As also described above, the blocker door 436 is configured to block a portion of a bypass flow when the thrust reverser 402 assumes a deployed configuration. A primary hydraulic actuator 450 (or a master actuator) is connected between the fixed structure 452 and the translating sleeve 425. A secondary hydraulic actuator 451 (or a slave actuator or a slave cylinder) is connected between the translating sleeve 425 and the blocker door 436. While, for clarity, the disclosure generally focuses on operation of the blocker door 436 and the secondary hydraulic actuator 451, it shall be appreciated, as illustrated in FIGS. 4A and 4B, that the thrust reverser 402 may include a plurality of blocker doors (e.g., a first blocker door $436_1$, a second blocker door $436_2$, a third blocker door $436_3$ and a fourth blocker door $436_4$) operated by a plurality of secondary hydraulic actuators (e.g., a first secondary hydraulic actuator $451_1$, a second secondary hydraulic actuator $451_2$, a third secondary hydraulic actuator $451_3$ and a fourth secondary hydraulic actuator $451_4$).

In various embodiments, the blocker door 436 may be coupled at a first hinge 454 (or a first joint) to the translating sleeve 425 and at a second hinge 455 (or a second joint) to the secondary hydraulic actuator 451. The secondary hydraulic actuator 451 may be coupled as well to the translating sleeve 425 at any suitable location, such as at a third hinge 456 (or a third joint). Each of the first hinge 454, the second hinge 455 and the third hinge 456 is configured to enable the blocker door 436 to pivot substantially radially inward toward an inner fixed structure, such as, for example, the inner fixed structure 110 described above with reference to FIGS. 1B and 1C, as the blocker door 436 is deployed. In various embodiments, the primary hydraulic actuator 450 is coupled to the translating sleeve 425 at a fourth hinge 488 (or a fourth joint) and to the fixed structure 452 at a fifth hinge 489 (or a fifth joint).

With continued reference to FIGS. 4A and 4B, the thrust reverser 402 includes a thrust reverser hydraulic circuit 460 (or a drive system) configured to drive or otherwise operate the thrust reverser 402. The thrust reverser hydraulic circuit 460 includes a hydraulic supply line 462 that fluidly couples the primary hydraulic actuator 450 to the various actuators and related components described herein. In various embodiments, the hydraulic supply line 462 couples a second end 466 of the primary hydraulic actuator 450 (e.g., a cylinder within the primary hydraulic actuator) to a second end 467 of the secondary hydraulic actuator 451 (e.g., a cylinder within the secondary hydraulic actuator). The hydraulic supply line 462 is further coupled to a reservoir 468 which, in various embodiments, may be pressurized. In various embodiments, the primary hydraulic actuator 450 includes a cylinder 470 (or a primary cylinder), a piston 471 (or a primary piston) disposed to slide within the cylinder 470 (e.g., between a first end 463 and the second end 466) and a rod 472 (or a primary rod) having a first rod end attached to the piston 471 and a second rod end attached to the fixed structure 452. Similarly, the secondary hydraulic actuator 451 includes a cylinder 473 (or a secondary cylinder), a piston 474 (or a secondary piston) disposed to slide within the cylinder 473 (e.g., between a first end 464 and the second end 467) and a rod 475 (or a secondary rod) having a first rod end attached to the piston 474 and a second rod end attached to the blocker door 436.

Referring to FIG. 4A, the thrust reverser 402 is illustrated in a stowed configuration. In the stowed configuration, the blocker door 436 assumes a raised position, such that the blocker door 436 does not generally interfere with a bypass flow. In this configuration, the piston 471 of the primary hydraulic actuator 450 is positioned substantially toward the first end 463 of the cylinder 470, hydraulic fluid substantially fills the cylinder 470 between the piston 471 and the second end 466 of the cylinder 470 (or of the primary hydraulic actuator 450) and air fills the remaining portion of the cylinder 470 between the piston 471 and the first end 463 of the cylinder 470. In various embodiments, then, the primary hydraulic actuator 450 includes a primary hydraulic fluid end (e.g., the portion of the cylinder 470 between the piston 471 and the second end 466) and a primary gaseous fluid end (e.g., the portion of the cylinder 470 between the piston 471 and the first end 463). Also in the stowed configuration, the piston 474 of the secondary hydraulic actuator 451 is positioned substantially toward the second end 467 of the cylinder 473 (or of the secondary hydraulic actuator 451), air (or some other gas) substantially fills the cylinder 473 between the piston 474 and the first end 464 of the cylinder 473 (or of the secondary hydraulic actuator 451) and hydraulic fluid fills the remaining portion of the cylinder 473 between the piston 474 and the second end 467 of the cylinder 473. In various embodiments, then, the secondary hydraulic actuator 451 includes a secondary hydraulic fluid end (e.g., the portion of the cylinder 473 between the piston 474 and the second end 467) and a secondary gaseous fluid end (e.g., the portion of the cylinder 473 between the piston 474 and the first end 464). Referring to FIG. 4B, the thrust reverser 402 is illustrated in a deployed configuration. In the deployed configuration, the blocker door 436 assumes a lowered position, such that the blocker door 436 extends into and interferes with (e.g., blocks) a bypass flow. In this configuration, the piston 471 of the primary hydraulic actuator 450 is positioned substantially toward the second end 466 of the cylinder 470 and air (or some other gas) substantially fills the cylinder 470 between the piston 471 and the first end 463 of the cylinder 470. Also in the deployed configuration, the piston 474 of the secondary hydraulic actuator 451 is positioned substantially toward the first end 464 of the cylinder 473 and hydraulic fluid substantially fills the cylinder 473 between the piston 474 and the second end 467 of the cylinder 473.

During operation, for example when transitioning the thrust reverser 402 from the stowed configuration to the deployed configuration, the sleeve actuator 432 drives the translating sleeve 425 a distance away from the fixed structure 452 until the translating sleeve 425 assumes the deployed configuration. Driving the translating sleeve 425 from the stowed configuration (as illustrated in FIG. 4A) to the deployed configuration (as illustrated in FIG. 4B) causes the piston 471 of the primary hydraulic actuator 450 to move from the first end 463 of the cylinder 470 to the second end 466 of the cylinder 470. This, in turn, forces hydraulic fluid out the primary hydraulic actuator 450 at the second end 466 of the cylinder 470, into the hydraulic supply line 462 and into the secondary hydraulic actuator 451 at the second end 467 of the cylinder 473. Forcing hydraulic fluid into the secondary hydraulic actuator 451 at the second end 467 of the cylinder 473, in turn, causes the piston 474 to move from the second end 467 of the cylinder 473 to the first end 464 of the cylinder 473, thereby forcing the blocker door 436 into its deployed configuration.

At the same time (i.e., during the transition from the stowed configuration to the deployed configuration), the air within the cylinder 473 of the secondary hydraulic actuator 451 is compressed as the piston 474 traverses from the second end 467 to the first end 464 of the cylinder 473. The compressed air, confined primarily toward the first end 464 of the cylinder 473 when in the deployed configuration, provides a bias or a compressive spring-like force that acts on the piston 474, tending to drive the piston 474 back toward the second end 467 of the cylinder. In similar fashion, as the piston 471 of the primary hydraulic actuator 450 traverses from the first end 463 toward the second end 466 of the cylinder 470, a vacuum is formed between the piston 471 and the first end 463 of the cylinder 470. The vacuum provides a bias or tensile spring-like force that acts on the piston 471, tending to pull the piston 471 back toward the first end 463 of the cylinder 470. In various embodiments, the compressive and tensile spring-like forces just described operate to drive the translating sleeve 425 back to the stowed configuration upon deactivation or reversal of the sleeve actuator 432. In various embodiments, a bias member 496, such as, for example, a coil spring, may be included to increase a restoring force tending to drive the translating sleeve 425 from the deployed configuration to the stowed configuration. In various embodiments, the bias member 496, as illustrated, includes a first end connected to the blocker door 436 and a second end connected to the translating sleeve 425. In various embodiments, the bias member 496 may be configured such that the first end is coupled to the blocker door 436 and the second end is coupled to the translating sleeve 425, for example, by positioning the coil spring about the rod 475, between the second hinge 455 and the first end 464 of the cylinder 473. As illustrated further in FIGS. 4A and 4B, the bias member 496 may assume an unloaded state, as illustrated in FIG. 4A and a loaded or tensile state, as illustrated in FIG. 4B.

When transitioning the thrust reverser 402 from the deployed configuration to the stowed configuration, the sleeve actuator 432 drives the translating sleeve 425 the distance back to the fixed structure 452 until the translating sleeve 425 assumes the stowed configuration. In various embodiments, as described above, rather than the sleeve actuator 432 driving the translating sleeve 425 back to the stowed configuration, the compressive and tensile spring-like forces described above operate to drive the translating sleeve 425 back to the stowed configuration, either in conjunction with the sleeve actuator 432, or upon deactivation or reversal of the sleeve actuator 432. Driving the translating sleeve 425 from the deployed configuration (as illustrated in FIG. 4B) to the stowed configuration (as illustrated in FIG. 4A) causes the piston 471 of the primary hydraulic actuator 450 to move from the second end 466 of the cylinder 470 to the first end 463 of the cylinder 470. This, in turn, causes the flow of hydraulic fluid within the hydraulic supply line 462, as described above, to be reversed, thereby forcing the blocker door 436 to return to the stowed configuration. Additionally, while the disclosure generally focuses on hydraulic circuits and systems for operating the various actuators, the disclosure contemplates other suitable fluids, including pneumatic fluids under pressure, to operate the various components. Thus, the term hydraulic fluids should be interpreted broadly to include all such fluids, liquid or gaseous, capable of being used to operate the actuators described in the various embodiments.

Figure 5A:
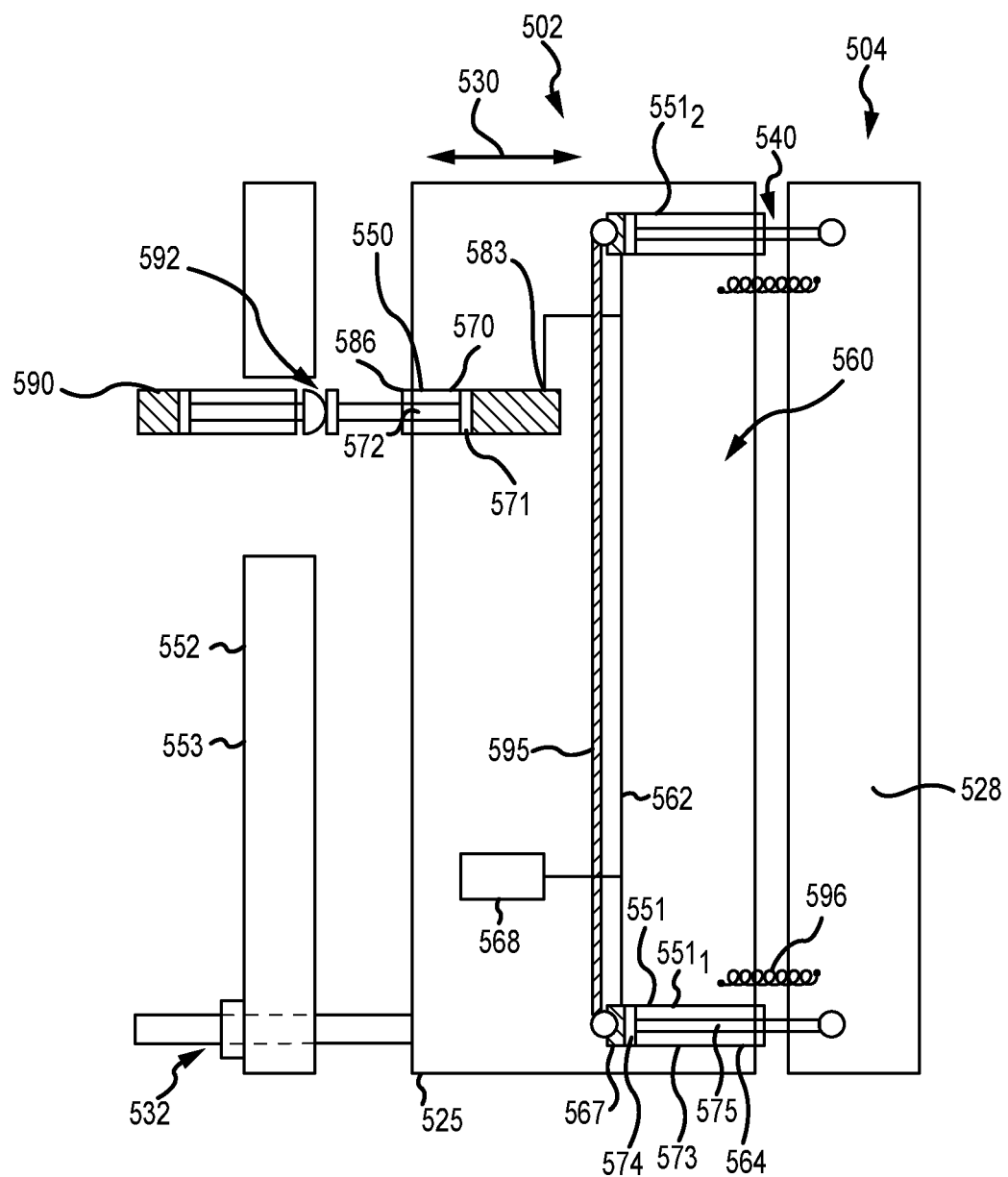
FIG. 5A is a schematic view of a translating thrust reverser in a stowed configuration, a variable area fan nozzle in a closed position and a drive system configured to translate a translating nozzle of the variable area fan nozzle, in accordance with various embodiments.
Figure 5B:
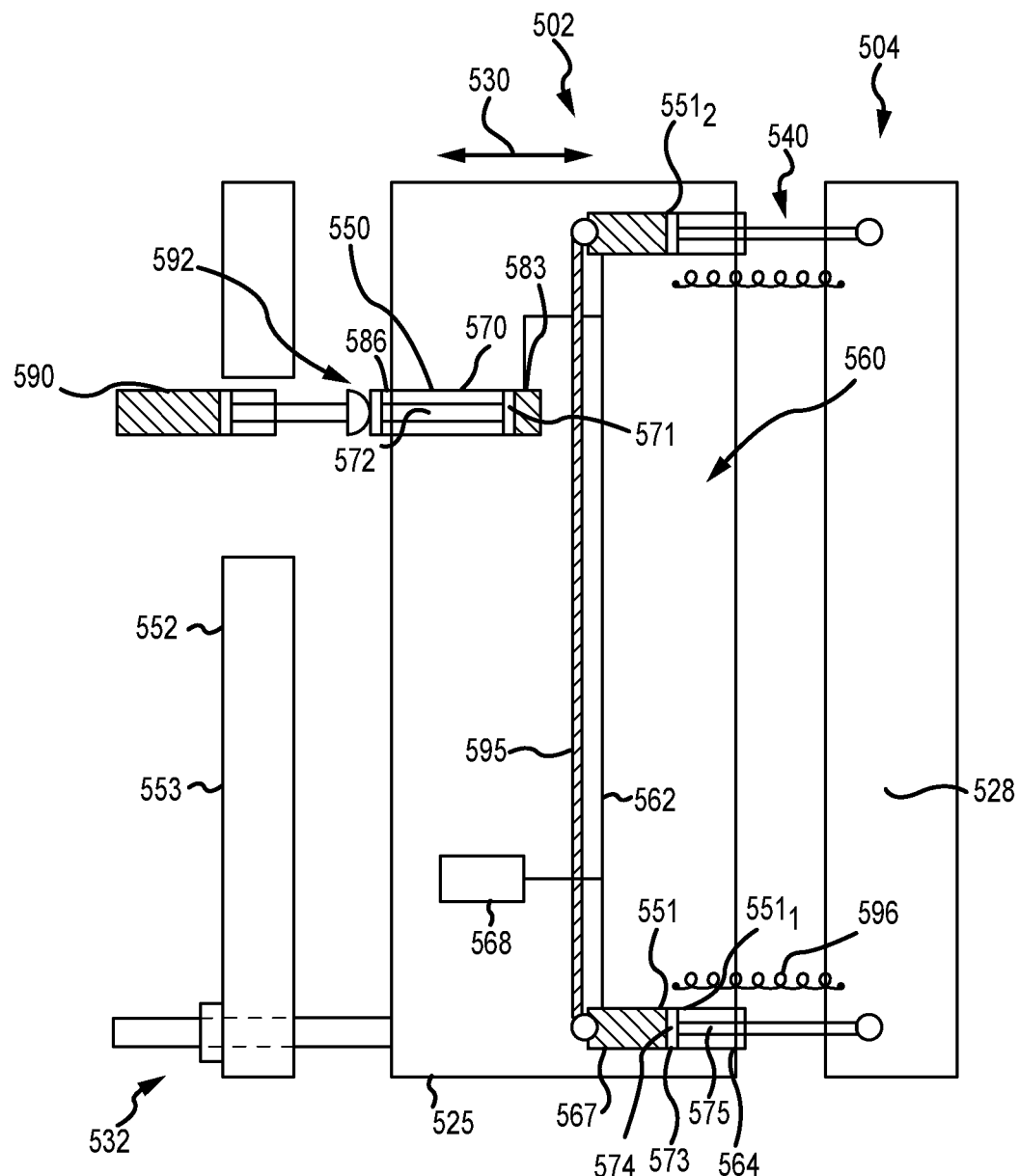
FIG. 5B is a schematic view of a translating thrust reverser in a stowed configuration, a variable area fan nozzle in an open position and a drive system configured to translate a translating nozzle of the variable area fan nozzle, in accordance with various embodiments.
Figure 5C:
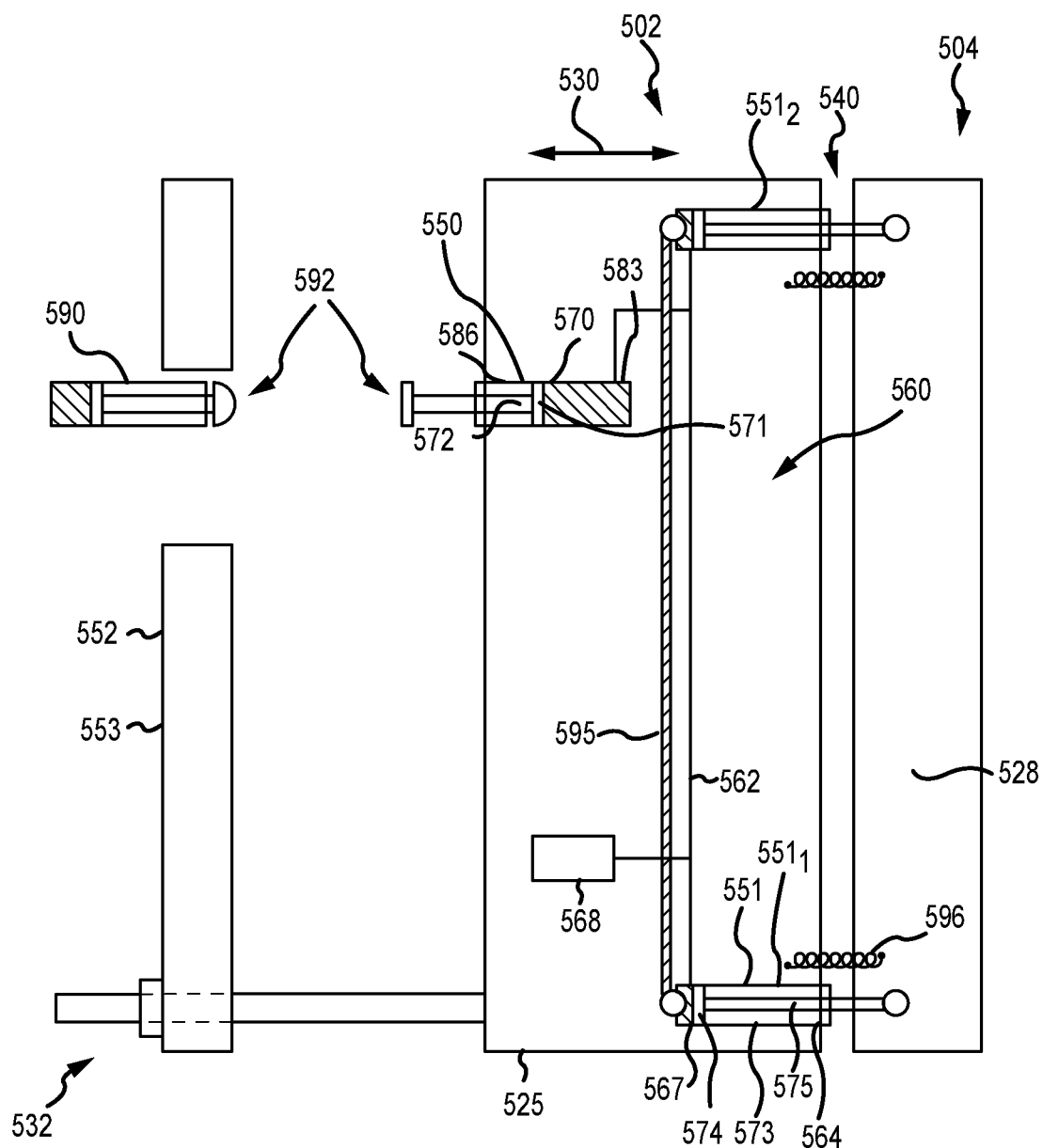
FIG. 5C is a schematic view of a translating thrust reverser in a deployed configuration, a variable area fan nozzle in a closed position and a drive system configured to translate a translating nozzle of the variable area fan nozzle, in accordance with various embodiments.

Referring now to FIGS. 5A, 5B and 5C, schematic views of a nacelle system for a gas turbine engine are provided. In accordance with various embodiments, the nacelle system includes a thrust reverser 502, configured to translate between a stowed configuration and a deployed configuration via a first hydraulic system (e.g., the thrust reverser hydraulic circuit 460 described above with reference to FIGS. 4A and 4B)), and a variable area fan nozzle 504, also configured to translate between a stowed configuration and a deployed configuration via a second hydraulic system (e.g., a variable area fan nozzle hydraulic circuit 560 described below). In various embodiments, the thrust reverser 502 includes a translating sleeve 525 configured to translate in fore and aft directions (as indicated by the bidirectional arrow 530) and is operated by a sleeve actuator 532, which may comprise any suitable actuation system capable of driving a rapid translation of the translating sleeve 525 for deployment of the thrust reverser, such as, for example, a ball screw mechanism or a hydraulic cylinder. In various embodiments, the sleeve actuator 532 is connected between a fixed structure 552, such as, for example, a torque box 553, and the translating sleeve 525. Otherwise, in various embodiments, the thrust reverser 502 shares the same construction and operational characteristics as the thrust reverser 202 described above with reference to FIGS. 2A and 2B or the thrust reverser 402 described above with reference to FIGS. 4A and 4B. Accordingly, for brevity, such construction and operational characteristics are not repeated here, unless otherwise helpful in describing construction and operation of the variable area fan nozzle 504.

In various embodiments, the variable area fan nozzle 504 includes a translating nozzle 528, similar to the translating nozzle 128 described above with reference to FIGS. 1A, 1B and 1C. As also described above, the translating nozzle 528 is configured for selective translation (e.g., moved fore and aft) to vary an exit area "$A_{EXIT}$" of the exit of the variable area fan nozzle 504 (or a primary fan nozzle exit) and to adjust an amount of the bypass flow spilled through an upstream exit 540 formed by a gap between the translating nozzle 528 and the translating sleeve 525 (or another nacelle component that may or may not be stationary with respect to a fixed structure on the nacelle). A primary hydraulic actuator 550 (or a master actuator) is connected proximate the fixed structure 552 and to the translating sleeve 525. A secondary hydraulic actuator 551 (or a slave actuator or a slave cylinder) is connected to the translating sleeve 525 and to the translating nozzle 528. While, for clarity, the disclosure generally focuses on operation of the translating nozzle 528 and the secondary hydraulic actuator 551, it shall be appreciated, as illustrated in FIGS. 5A, 5B and 5C, that the variable area fan nozzle 504 may include a plurality of nozzle sections (e.g., the first nozzle section 127 and the second nozzle section 129 described above with reference to FIG. 1A), each of which may be operated by a plurality of secondary hydraulic actuators (e.g., a first secondary hydraulic actuator $551_1$ and a second secondary hydraulic actuator $551_2$). Further, each of the first secondary hydraulic actuator $551_1$ and the second secondary hydraulic actuator $551_2$, may, in various embodiments, be connected via a synchronization shaft 595 to facilitate synchronized operation of the first secondary hydraulic actuator $551_1$ with the second secondary hydraulic actuator $551_2$.

With continued reference to FIGS. 5A, 5B and 5C, the variable area fan nozzle 504 includes a variable area fan nozzle hydraulic circuit 560 (or a drive system) configured to drive or otherwise operate the variable area fan nozzle 504. The variable area fan nozzle hydraulic circuit 560 includes a hydraulic supply line 562 that fluidly couples the primary hydraulic actuator 550 to the various actuators and related components described herein. In various embodiments, the hydraulic supply line 562 couples a first end 583 of the primary hydraulic actuator 550 to a second end 567 of the secondary hydraulic actuator 551. The hydraulic supply line 562 is further coupled to a reservoir 568 which, in various embodiments, may be pressurized. In various embodiments, the primary hydraulic actuator 550 includes a cylinder 570 (or a primary cylinder), a piston 571 (or a primary piston) disposed to slide within the cylinder 570 (e.g., between the first end 583 and a second end 586) and a rod 572 (or a primary rod) having a first rod end attached to the piston 571 and a second rod end releasably attached to a master actuator 590 (or a drive structure), which is attached to the fixed structure 552. The secondary hydraulic actuator 551 includes a cylinder 573, a piston 574 disposed to slide within the cylinder 573 (e.g., between the first end 564 and the second end 567) and a rod 575 having a first rod end attached to the piston 574 and a second rod end attached to the translating nozzle 528.

Referring to FIG. 5A, the variable area fan nozzle 504 is illustrated in a closed or nearly closed configuration. In the closed configuration, the translating nozzle 528 assumes a position aft of a trailing end of the translating sleeve 525 such that the upstream exit 540 is completely closed or otherwise open only a nominal amount. In this configuration, the piston 571 of the primary hydraulic actuator 550 is positioned substantially toward the second end 586 of the cylinder 570, leaving the cylinder 570 substantially filled with hydraulic fluid between the piston 571 and the first end 583 and filled with air (or some other gas) between the piston 571 and the second end 586. In various embodiments, then, the primary hydraulic actuator 550 includes a primary hydraulic fluid end (e.g., the portion of the cylinder 570 between the piston 571 and the first end 583) and a primary gaseous fluid end (e.g., the portion of the cylinder 570 between the piston 571 and the second end 586). Similarly, in the closed configuration, the piston 574 of the secondary hydraulic actuator 551 is positioned substantially toward the second end 567 of the cylinder 573, air (or some other gas) substantially fills the cylinder 573 between the piston 574 and the first end 564 of the cylinder 573 and hydraulic fluid fills the remaining portion of the cylinder 573 between the piston 574 and the second end 567 of the cylinder 573. In various embodiments, then, the secondary hydraulic actuator 551 includes a secondary hydraulic fluid end (e.g., the portion of the cylinder 573 between the piston 574 and the second end 567) and a secondary gaseous fluid end (e.g., the portion of the cylinder 573 between the piston 574 and the first end 564). Referring to FIG. 5B, the variable area fan nozzle 504 is illustrated in an open configuration. In the open configuration, the translating nozzle 528 assumes a position aft of the trailing end of the translating sleeve 525 such that the upstream exit 540 is open an amount greater than the completely closed or nominally open positions such that a portion of the bypass flow is spilled through the upstream exit 540 between the translating nozzle 528 and the translating sleeve 525. In this configuration, the piston 571 of the primary hydraulic actuator 550 is positioned substantially toward the first end 583 of the cylinder 570, leaving the cylinder 570 substantially empty of hydraulic fluid between the piston 571 and the second end 586. Similarly, while in the closed configuration, the piston 574 of the secondary hydraulic actuator 551 is positioned substantially toward the first end 564 of the cylinder 573 and hydraulic fluid substantially fills the cylinder 573 between the piston 574 and the second end 567 of the cylinder 573.

During operation, for example, when transitioning the variable area fan nozzle 504 from the closed configuration to the open configuration, the master actuator 590 drives the piston 571 of the primary hydraulic actuator 550 to move from the second end 586 of the cylinder 570 to the first end 583 of the cylinder 570. This, in turn, forces hydraulic fluid out the primary hydraulic actuator 550 at the first end 583 of the cylinder 570, into the hydraulic supply line 562 and into the secondary hydraulic actuator 551 at the second end 567 of the cylinder 573. Forcing hydraulic fluid into the secondary hydraulic actuator 551 at the second end 567 of the cylinder 573, in turn, causes the piston 574 to move from the second end 567 of the cylinder 573 to the first end 564 of the cylinder 573, thereby forcing the translating nozzle 528 to translate aft of a trailing end of the translating sleeve 525.

At the same time (i.e., during the transition from the closed configuration to the open configuration), the air within the cylinder 573 of the secondary hydraulic actuator 551 is compressed as the piston 574 traverses from the second end 567 to the first end 564 of the cylinder 573. The compressed air, confined primarily toward the first end 564 of the cylinder 573 when in the open configuration, provides a bias or a compressive spring-like force that acts on the piston 574, tending to drive the piston 574 back toward the second end 567 of the cylinder. In similar fashion, as the piston 571 of the primary hydraulic actuator 550 traverses from the second end 586 toward the first end 583 of the cylinder 570, a vacuum is formed between the piston 571 and the second end 586 of the cylinder 570. The vacuum provides a bias or tensile spring-like force that acts on the piston 571, tending to pull the piston 571 back toward the second end 586 of the cylinder 570. In various embodiments, the compressive and tensile spring-like forces just described operate to drive the translating nozzle 528 back to the closed configuration upon deactivation or reversal of the master actuator 590. In various embodiments, a bias member 596, such as, for example, a coil spring, may be included to increase a restoring force tending to drive the translating nozzle 528 from the open configuration to the closed configuration. In various embodiments, the bias member 596, as illustrated, includes a first end connected to the translating nozzle 528 and a second end connected to the translating sleeve 525. As illustrated further in FIGS. 5A and 5B, the bias member 596 may assume an unloaded state, as illustrated in FIG. 5A and a loaded or tensile state, as illustrated in FIG. 5B. When transitioning the variable area fan nozzle 504 from the open configuration to the closed configuration, the master actuator 590 retracts, thereby permitting the compressive and tensile spring-like forces described above to force the translating nozzle 528 to return to the closed configuration, with the flow of hydraulic fluid within the hydraulic supply line 562, as described above, to be reversed.

Still referring to FIGS. 5A, 5B and 5C, the variable area fan nozzle 504 includes a decoupling system configured to decouple the primary hydraulic actuator 550 from the master actuator 590 upon activation of the thrust reverser 502 from a stowed configuration to a deployed configuration. In various embodiments, for example, both the primary hydraulic actuator 550 and the master actuator 590 remain in contact via a coupling component 592 which, in various embodiments, includes a first contact member connected to the primary hydraulic actuator 550 and a second contact member connected to the master actuator 590. Comparing FIGS. 5A and 5B with FIG. 5C, the coupling component 592 enables continual operational contact between the primary hydraulic actuator 550 and the master actuator 590 regardless of the configuration of the variable area fan nozzle 504, so long as the thrust reverser assumes a stowed configuration. Upon activation of the thrust reverser 502, however, from a stowed configuration to a deployed configuration, the coupling component 592 functions to separate the primary hydraulic actuator 550 from the master actuator 590, thereby deactivating the variable area fan nozzle 504 and preventing translation of the translating nozzle 528 during such time the thrust reverser 502 assumes a deployed state. Additionally, while the disclosure generally focuses on hydraulic circuits and systems for operating the various actuators, the disclosure contemplates other suitable fluids, including pneumatic fluids under pressure, to operate the various components. Thus, the term hydraulic fluids should be interpreted broadly to include all such fluids, liquid or gaseous, capable of being used to operate the actuators described in the various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for a nacelle having a translating structure, comprising:
   a translating sleeve;
   a blocker door;
   a fixed structure;
   a primary hydraulic actuator configured to couple the fixed structure with the translating sleeve;
   a secondary hydraulic actuator configured to couple the blocker door with the translating sleeve;
   a first hydraulic supply line configured to fluidly couple a first fluid end of the primary hydraulic actuator to a first fluid end of the secondary hydraulic actuator; and
   a second hydraulic supply line configured to fluidly couple a second fluid end of the primary hydraulic actuator to a second fluid end of the secondary hydraulic actuator,
   wherein the first hydraulic supply line is configured to fluidly couple a first reservoir to the first fluid end of the primary hydraulic actuator and to the first fluid end of the secondary hydraulic actuator.

2. The system of claim 1, further comprising a sleeve actuator configured to translate the translating sleeve with respect to the fixed structure.

3. The system of claim 1, wherein the primary hydraulic actuator comprises a primary cylinder, a primary piston and a primary rod, the primary rod having a first rod end attached to the primary piston and a second rod end attached to the fixed structure.

4. The system of claim 1, wherein the secondary hydraulic actuator comprises a secondary cylinder, a secondary piston and a secondary rod, the secondary rod having a first rod end attached to the secondary piston and a second rod end attached to the blocker door.

5. The system of claim 1, wherein the second hydraulic supply line is configured to fluidly couple a second reservoir to the second fluid end of the primary hydraulic actuator and to the second fluid end of the secondary hydraulic actuator.

\* \* \* \* \*